US012706760B2

(12) United States Patent
Wang et al.

(10) Patent No.: US 12,706,760 B2
(45) Date of Patent: Aug. 11, 2026

(54) COMMUNICATION METHOD INTEGRATED WITH TRUSTWORTHINESS MEASUREMENT AND APPARATUS

(71) Applicant: HUAWEI TECHNOLOGIES CO., LTD., Shenzhen (CN)

(72) Inventors: Donghui Wang, Beijing (CN); Fei Liu, Singapore (SG); Liqun Chen, Surrey (GB); Loganathan Parthipan, Surrey (GB); Christopher J. P. Newton, Surrey (GB); Yunpeng Li, Surrey (GB)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 21 days.

(21) Appl. No.: 18/763,177

(22) Filed: Jul. 3, 2024

(65) Prior Publication Data

US 2024/0364542 A1 Oct. 31, 2024

Related U.S. Application Data

(63) Continuation of application No. PCT/CN2022/140545, filed on Dec. 21, 2022.

(30) Foreign Application Priority Data

Jan. 5, 2022 (CN) ........................ 202210011105.1

(51) Int. Cl.
*H04L 9/32* (2006.01)
*H04L 9/08* (2006.01)

(52) U.S. Cl.
CPC .......... *H04L 9/3271* (2013.01); *H04L 9/0869* (2013.01); *H04L 9/3297* (2013.01)

(58) Field of Classification Search
CPC .................................................... H04L 9/3271
See application file for complete search history.

(56) References Cited

U.S. PATENT DOCUMENTS

| | | | | |
|---|---|---|---|---|
| 9,906,528 | B2 * | 2/2018 | Laitinen | H04W 12/0431 |
| 11,321,465 | B2 * | 5/2022 | Sheth | G06F 21/606 |
| 11,520,895 | B2 * | 12/2022 | Chen | G06F 9/4406 |
| 11,704,146 | B2 * | 7/2023 | Pascual | G06F 9/45558 718/1 |
| 2012/0260345 | A1 | 10/2012 | Quinn et al. | |
| 2020/0320199 | A1 | 10/2020 | Sheth et al. | |
| 2020/0322375 | A1 | 10/2020 | Sheth et al. | |
| 2020/0322423 | A1 * | 10/2020 | Sheth | H04L 63/123 |
| 2023/0108626 | A1 * | 4/2023 | Schneider | H04L 9/0825 713/168 |

OTHER PUBLICATIONS

Globalsign, "TPM LDevID Enrollment with GlobalSign IoT Edge Enroll & Infineon Optiga™ TPM", GMO Internet Group, Jul. 28, 2020, Version 1.4, 14 pages.

* cited by examiner

*Primary Examiner* — Simon P Kanaan
(74) *Attorney, Agent, or Firm* — Maier & Maier, PLLC

(57) ABSTRACT

A communication method integrated with trustworthiness measurement, including: a first network element sends a first data packet, where the first data packet includes first request information, and the first request information is used to request to verify whether a second network element is trusted. The first network element receives a second data packet, where the second data packet includes first response information, and the first response information is used to verify whether the second network element is trusted.

20 Claims, 8 Drawing Sheets

<table>
<tr><td>Next payload header</td><td>Payload length</td><td>Reserved</td></tr>
<tr><td colspan="3">Security parameter index</td></tr>
<tr><td colspan="3">Sequence number</td></tr>
<tr><td colspan="3">Authentication data (integrity check value)</td></tr>
</table>

First network element

Second network element

S1010: Integrate trusted request information

S1020: Trusted request information

S1030: Integrate trusted response information

S1040: Trusted response information

S1050: Verify the trusted response information

| SPI of an IKE SA initiator | | | | |
|---|---|---|---|---|
| SPI of an IKE SA responder | | | | |
| Next payload | Major version | Minor version | Exchange type | Flag |
| Message identifier | | | | |
| Length | | | | |

| Next payload header | Payload length | Flag | Reserved |
|---|---|---|---|
| Sequence number | | | |
| Trusted data | | | |

COMMUNICATION METHOD INTEGRATED WITH TRUSTWORTHINESS MEASUREMENT AND APPARATUS

CROSS-REFERENCE TO RELATED APPLICATIONS

This application is a continuation of International Application No. PCT/CN2022/140545, filed on Dec. 21, 2022, which claims priority to Chinese Patent Application No. 202210011105.1, filed on Jan. 5, 2022. The disclosures of the aforementioned applications are hereby incorporated by reference in their entireties.

TECHNICAL FIELD

The embodiments relate to the communication field, a communication method integrated with trustworthiness measurement, and an apparatus.

BACKGROUND

An internet protocol security (IPsec) protocol is a network-layer security protocol. The protocol can standardize or describe communication between two or more communication entities and provide security assurance and data integrity assurance for a communication process. However, the protocol considers only security of the communication process between the communication entities and cannot determine whether the communication entities are in a trusted execution state. If any one of the communication entities is in an untrusted state, the security of the communication process is threatened. Therefore, when a communication channel is established, it is necessary to perform trustworthiness measurement on the communication entities, to improve the security of the communication process and security of the communication entities.

SUMMARY

The embodiments provide a communication method integrated with trustworthiness measurement and an apparatus, to perform trustworthiness measurement when a communication channel is established between communication entities and improve security of communication entities and a communication process.

According to a first aspect, a communication method integrated with trustworthiness measurement is provided. The method may be performed by a first network element or may be performed by a chip or a circuit used in the first network element. This is not limited. For ease of description, an example in which the method is performed by the first network element is used.

The method includes: The first network element sends a first data packet, where the first data packet includes first request information, and the first request information is used to request to verify whether a second network element is trusted. The first network element receives a second data packet, where the second data packet includes first response information, and the first response information is used to verify whether the second network element is trusted.

In this embodiment, remote attestation is deployed in a process of communication between the first network element and the second network element. The first network element initiates a verification request to the second network element, to trigger the second network element to perform trustworthiness measurement and respond, and the first network element verifies, based on the response information of the second network element, whether the second network element is trusted, so that the trustworthiness measurement can be performed in a process of establishing communication between the first network element and the second network element. This helps improve security of the communication process between the first network element and the second network element and improve security of the first network element and the second network element.

With reference to the first aspect, in some implementations of the first aspect, the first request information includes a first field, the first field is a first flag, and the first flag is used to trigger generation of the first response information.

In this embodiment, the first data packet may include only the first flag and does not include a first challenge value. When receiving the first data packet including the first flag, the second network element generates the first response information. The first network element does not need to generate or reuse the challenge value for the second network element to generate the first response information, so that resource overheads can be reduced.

With reference to the first aspect, in some implementations of the first aspect, the first flag is used to identify that the first request information includes the first challenge value, and the first challenge value is used to generate the first response information.

In this embodiment, the first data packet may include both the first flag and the first challenge value. The first flag may be used to identify that the first data packet includes the first challenge value, and the first challenge value triggers the second network element to generate the first response information. The data packet may include related information about trustworthiness measurement, and trustworthiness verification may be performed on the second network element in the process of establishing the communication, to improve the security of the communication process between the first network element and the second network element, and further improve the security of the first network element and the second network element.

With reference to the first aspect, in some implementations of the first aspect, the first request information includes a second field, the second field includes the first challenge value, and the first challenge value is used by the second network element to generate the first response information.

In this embodiment, when the first request information may include the first challenge value, and the first network element and the second network element do not pre-agree on or pre-store the challenge value, the first challenge value may be used by the second network element to generate the first response information and used by the first network element to perform the trustworthiness verification on the second network element, to improve the security of the communication process between the first network element and the second network element, and further improve the security of the first network element and the second network element.

With reference to the first aspect, in some implementations of the first aspect, the first challenge value is any one of a first random number, a second random number, a timestamp, and a value of an agreed field. The first random number is a random number provided by a trusted third party. The second random number is a random number generated by the first network element to verify whether the second network element is trusted. The timestamp is a trusted clock trusted by both the first network element and the second network element, for example, clock information generated by a clock endorsed by an endorser. The value of the agreed field is any $X^{th}$ to $Y^{th}$ bit data in a protocol such as an IPsec protocol.

In this embodiment, the first network element may reuse the first random number, the timestamp, or the value of the agreed field as the challenge value, does not need to generate a random number as the challenge value for performing trustworthiness measurement on the second network element, so that resource overheads can be reduced, and does not need to add a new field to store the challenge value, to simplify a structure of the first data packet, help the second network element parse the first data packet, and further improve response efficiency of the second network element.

With reference to the first aspect, in some implementations of the first aspect, the value of the agreed field is a sequence number of the first data packet.

In this embodiment, the first network element may reuse the sequence number of the first data packet as the first challenge value, and the agreed field is a sequence number field, so that resource overheads can be reduced. No new field needs to be added to store the challenge value, to simplify a structure of the first data packet, help the second network element parse the first data packet, and further improve response efficiency of the second network element.

The first network element may select, based on an actual requirement, different types of challenge values that are used by the second network element to generate the first response information, to improve flexibility of initiating the trustworthiness verification by the first network element.

With reference to the first aspect, in some implementations of the first aspect, the first request information includes a third field, and the third field includes a length of the first challenge value.

In this embodiment, in the data packet, the first challenge value may occupy only a part of the second field, and length information of the challenge value is stored in the third field, to help the second network element read a field occupied by the challenge value in the second field and reduce reading time and resource overheads.

With reference to the first aspect, in some implementations of the first aspect, the first response information includes a fourth field, the fourth field is a second flag, and the second flag is used to identify that the second data packet includes attestation information or an attestation result. The attestation information is generated based on the first challenge value by the first network element, and the attestation result includes a result that the second network element is attested to be trusted.

In this embodiment, the data packet includes the second flag, to help the first network element learn that the second data packet includes valid information used to verify whether the second network element is trusted, read the first response information and verify, based on the first response information, whether the second network element is trusted, thereby avoiding a problem such as a packet loss.

With reference to the first aspect, in some implementations of the first aspect, the first response information includes a fifth field, and the fifth field includes the attestation information or the attestation result.

In this embodiment, the second data packet may include the attestation information, so that the attestation information of the second network element can be verified in the process of establishing the communication between the first network element and the second network element, to verify whether the second network element is trusted, improve the security of the communication process between the first network element and the second network element, and improve the security of the first network element and the second network element. Alternatively, the second data packet may alternatively include the attestation result, where the attestation result may be a result that another verifier verifies that the second network element is trusted. The attestation result is sent to the second network element and is used by the second network element to present to a subsequent verifier such as the first network element. The first network element does not need to verify the attestation information, but only needs to check the attestation result and confirm whether the second network element is trusted, so that resource overheads can be reduced.

With reference to the first aspect, in some implementations of the first aspect, the attestation result includes one or more of identity information, trusted content, and freshness. The identity information indicates an identity of a verifier who verifies that the second network element is trusted, the trusted content indicates content that is verified to be trusted and that is of the second network element, and the freshness indicates time at which the second network element is verified to be trusted.

In this embodiment, the second network element may store an attestation result obtained by verifying whether the second network element is trusted by another verifier. When receiving the first data packet of the first network element, the second network element sends the attestation result and does not need to repeatedly generate the attestation information, and the first network element does not need to perform a repeated verification process, so that resource overheads are reduced.

With reference to the first aspect, in some implementations of the first aspect, the first response information includes the attestation information, where the attestation information includes a quote and a measurement log. The quote includes a digest of the measurement log, and the measurement log includes process information for performing trustworthiness measurement by the second network element.

In this embodiment, the attestation information includes the quote and the measurement log, and the digest of the measurement log is obtained by performing hash calculation on the measurement log, so that the first network element may verify integrity of the measurement log. This helps improve the security of the communication process and improve the security of the network element.

With reference to the first aspect, in some implementations of the first aspect, the attestation information includes a measurement value, and the measurement value is information about whether the second network element is trusted.

In this embodiment, the attestation information includes the measurement value, and the measurement value is obtained by performing an operation on the measurement log by a trusted computing platform of the second network element, so that the first network element may verify the measurement log and determine validity of the measurement log in the attestation information, to improve the security of the communication process between the first network element and the second network element, and improve the security of the first network element and the second network element.

With reference to the first aspect, in some implementations of the first aspect, the attestation information includes a trusted signature, and the trusted signature is a signature of the second network element for the measurement value.

In this embodiment, the attestation information includes the trusted signature, so that the first network element may verify the trusted signature based on the corresponding challenge value, such as the first challenge value, and determine that the trusted signature is generated by the second network element based on the first challenge value, to verify whether the second network element is trusted, improve the security of the communication process between the first network element and the second network element, and improve the security of the first network element and the second network element.

With reference to the first aspect, in some implementations of the first aspect, the fifth field includes a second challenge value, the second challenge value is used by the first network element to generate second response information, and the second response information is used to verify whether the first network element is trusted.

In this embodiment, when the second network element is used as an attester to generate the first response information, the second network element may also be used as a verifier to initiate a verification request to the first network element, to request to verify whether the first network element is trusted. Therefore, bidirectional verification is performed, thereby improving the security of communication between the first network element and the second network element and improving the security of the first network element and the second network element.

With reference to the first aspect, in some implementations of the first aspect, the second challenge value is any one of a third random number, a fourth random number, a timestamp, and a value of an agreed field. The third random number is a random number provided by a trusted third party, and the fourth random number is a random number generated by the second network element to verify whether the first network element is trusted.

In this embodiment, the second network element may reuse the third random number, the timestamp, or the value of the agreed field as the challenge value, does not need to generate the challenge value for performing trustworthiness measurement, so that resource overheads can be reduced, and does not need to add a new field to store the challenge value, to simplify a structure of the second data packet, help the first network element parse the second data packet, and further improve response efficiency of the first network element.

With reference to the first aspect, in some implementations of the first aspect, the second flag is further used to trigger the first network element to generate the second response information.

In this embodiment, the first network element and the second network element may pre-agree on and pre-store the second challenge value in the second network element. When the second network element needs to initiate the verification request to the first network element to request to verify whether the first network element is trusted, the second network element does not need to generate the challenge value or reuse the challenge value, but the second flag is used to trigger the first network element to generate the second response information.

With reference to the first aspect, in some implementations of the first aspect, the first response information includes a sixth field, and the sixth field indicates a length of the attestation information or the attestation result.

In this embodiment, in the data packet, the attestation information may occupy only a part of the fifth field, and length information of the attestation information or the attestation result is stored in the sixth field, to help the first network element read a field occupied by the attestation information or the attestation result in the fifth field, and reduce reading time and resource overheads.

According to a second aspect, a communication method integrated with trustworthiness measurement is provided. The method may be performed by a second network element or may be performed by a chip or a circuit used in the second network element. This is not limited. For ease of description, an example in which the method is performed by the second network element is used.

The method includes: The second network element receives a first data packet, where the first data packet includes first request information, and the first request information is used to request to verify whether the second network element is trusted. The second network element sends a second data packet, where the second data packet includes first response information, and the first response information is used to verify whether the second network element is trusted.

In this embodiment, remote attestation is deployed in a process of communication between the first network element and the second network element. The first network element initiates a verification request to the second network element, to trigger the second network element to perform trustworthiness measurement and respond, and the first network element verifies, based on the response information of the second network element, whether the second network element is trusted, so that trustworthiness measurement can be performed in a process of establishing communication between the first network element and the second network element. This helps improve security of the communication process between the first network element and the second network element and improve security of the first network element and the second network element.

With reference to the second aspect, in some implementations of the second aspect, the first request information includes a first field, the first field is a first flag, and the first flag is used to trigger the second network element to generate the first response information.

In this embodiment, the first network element and the second network element may pre-agree on and pre-store a first challenge value in the second network element, set one or more bits in a reserved field in a packet header of the data packet to 1 as the first flag, and the first flag directly triggers the second network element to generate the first response information. In other words, the first data packet may include only the first flag and does not include the first challenge value. When receiving the first data packet including the first flag, the second network element generates the first response information. The first network element does not need to generate or reuse the challenge value for the second network element to generate the first response information, so that resource overheads can be reduced.

With reference to the second aspect, in some implementations of the second aspect, the first flag is used to identify that the first request information includes the first challenge value, and the first challenge value is used to generate the first response information.

In this embodiment, the first data packet may include both the first flag and the first challenge value. The first flag may be used to identify that the first data packet includes the first challenge value, and the first challenge value triggers the second network element to generate the first response information. The data packet may include related information about trustworthiness measurement, and trustworthiness verification may be performed on the second network element in the process of establishing the communication, to improve the security of the communication process between the first network element and the second network element, and further improve the security of the first network element and the second network element.

With reference to the second aspect, in some implementations of the second aspect, the first request information includes a second field, the second field includes the first challenge value, and the first challenge value is used by the second network element to generate the first response information.

In this embodiment, when the first request information may include the first challenge value, and the first network element and the second network element do not pre-agree on or pre-store the challenge value, the first challenge value may be used by the second network element to generate the first response information and used by the first network element to perform the trustworthiness verification on the second network element, to improve the security of the communication process between the first network element and the second network element, and further improve the security of the first network element and the second network element.

With reference to the second aspect, in some implementations of the second aspect, the first challenge value is any one of a first random number, a second random number, a timestamp, and a value of an agreed field. The first random number is a random number provided by a trusted third party. The second random number is a random number generated by the first network element to verify whether the second network element is trusted. The timestamp is a trusted clock trusted by both the first network element and the second network element, for example, clock information generated by a clock endorsed by an endorser. The value of the agreed field is any $X^{th}$ to $Y^{th}$ bit data in a protocol such as an IPsec protocol.

In this embodiment, the first network element reuses the first random number, the timestamp, or the value of the agreed field as the challenge value, does not need to generate a random number as the challenge value for performing trustworthiness measurement on the second network element, so that resource overheads can be reduced, and does not need to add a new field to store the challenge value, to simplify a structure of the first data packet, help the second network element parse the first data packet, and further improve response efficiency of the second network element.

With reference to the second aspect, in some implementations of the second aspect, the value of the agreed field is a sequence number of the first data packet.

In this embodiment, the first network element may reuse the sequence number of the first data packet as the first challenge value, and the agreed field is a sequence number field, so that resource overheads can be reduced. No new field needs to be added to store the challenge value, to simplify a structure of the first data packet, help the second network element parse the first data packet, and further improve response efficiency of the second network element.

The first network element may select, based on an actual requirement, different types of challenge values that are used by the second network element to generate the first response information, to improve flexibility of initiating the trustworthiness verification by the first network element.

With reference to the second aspect, in some implementations of the second aspect, the first request information includes a third field, and the third field includes a length of the first challenge value.

In this embodiment, in the data packet, the first challenge value may occupy only a part of the second field, and length information of the challenge value is stored in the third field, to help the second network element read a field occupied by the challenge value in the second field and reduce reading time and resource overheads.

With reference to the second aspect, in some implementations of the second aspect, the first response information includes a fourth field, the fourth field is a second flag, and the second flag is used to identify that the second data packet includes attestation information or an attestation result. The attestation information is generated based on the first challenge value by the first network element, and the attestation result includes a result that the second network element is attested to be trusted.

In this embodiment, the data packet includes the second flag, to help the first network element learn that the second data packet includes valid information used to verify whether the second network element is trusted, read the first response information and verify, based on the first response information, whether the second network element is trusted, thereby avoiding a problem such as a packet loss.

With reference to the second aspect, in some implementations of the second aspect, the first response information includes a fifth field, and the fifth field includes the attestation information or the attestation result.

In this embodiment, the second data packet may include the attestation information, so that the attestation information of the second network element can be verified in the process of establishing the communication between the first network element and the second network element, to verify whether the second network element is trusted, improve the security of the communication process between the first network element and the second network element, and improve the security of the first network element and the second network element. Alternatively, the second data packet may alternatively include the attestation result, where the attestation result may be a result that another verifier verifies that the second network element is trusted. The attestation result is sent to the second network element and is used by the second network element to present to a subsequent verifier such as the first network element. The first network element does not need to verify the attestation information, but only needs to check the attestation result and confirm whether the second network element is trusted, so that resource overheads can be reduced.

With reference to the second aspect, in some implementations of the second aspect, the fifth field includes the attestation result, and the attestation result includes one or more of identity information, trusted content, and freshness. The identity information indicates an identity of a verifier who verifies that the second network element is trusted, the trusted content indicates content that is verified to be trusted and that is of the second network element, and the freshness indicates time at which the second network element is verified to be trusted.

In this embodiment, the second network element may store an attestation result obtained by verifying whether the second network element is trusted by another verifier. When receiving the first data packet of the first network element, the second network element sends the attestation result and does not need to repeatedly generate the attestation information, and the first network element does not need to perform a repeated verification process, so that resource overheads are reduced.

With reference to the second aspect, in some implementations of the second aspect, the first response information includes the attestation information, where the attestation information includes a quote and a measurement log. The quote includes a digest of the measurement log, and the measurement log includes process information for performing trustworthiness measurement by the second network element.

In this embodiment, the attestation information includes the quote and the measurement log, and the digest of the measurement log is obtained by performing hash calculation on the measurement log, so that the first network element may verify integrity of the measurement log. This helps improve the security of the communication process and improve the security of the network element.

With reference to the second aspect, in some implementations of the second aspect, the attestation information includes a measurement value, and the measurement value is information about whether the second network element is trusted.

In this embodiment, the attestation information includes the measurement value, and the measurement value is obtained by performing an operation on the measurement log by a trusted computing platform of the second network element, so that the first network element may verify the measurement log and determine validity of the measurement log in the attestation information, to improve the security of the communication process between the first network element and the second network element, and improve the security of the first network element and the second network element.

With reference to the second aspect, in some implementations of the second aspect, the attestation information includes a trusted signature, and the trusted signature is a signature of the second network element for the measurement value.

In this embodiment, the attestation information includes the trusted signature, so that the first network element may verify the trusted signature based on the corresponding challenge value, such as the first challenge value, and determine that the trusted signature is generated by the second network element based on the first challenge value, to verify whether the second network element is trusted, improve the security of the communication process between the first network element and the second network element, and improve the security of the first network element and the second network element.

With reference to the second aspect, in some implementations of the second aspect, the fifth field includes a second challenge value, the second challenge value is used by the first network element to generate second response information, and the second response information is used to verify whether the first network element is trusted.

In this embodiment, when the second network element is used as an attester to generate the first response information, the second network element may also be used as a verifier to initiate a verification request to the first network element, to request to verify whether the first network element is trusted. Therefore, bidirectional verification is performed, thereby improving the security of communication between the first network element and the second network element and improving the security of the first network element and the second network element.

With reference to the second aspect, in some implementations of the second aspect, the second challenge value is any one of a third random number, a fourth random number, a timestamp, and a value of an agreed field. The third random number is a random number provided by a trusted third party, and the fourth random number is a random number generated by the second network element to verify whether the first network element is trusted.

In this embodiment, the second network element may reuse the third random number, the timestamp, or the value of the agreed field as the challenge value, does not need to generate the challenge value for performing trustworthiness measurement, so that resource overheads can be reduced, and does not need to add a new field to store the challenge value, to simplify a structure of the second data packet, help the first network element parse the second data packet, and further improve response efficiency of the first network element.

With reference to the second aspect, in some implementations of the second aspect, the second flag is further used to trigger the first network element to generate the second response information.

In this embodiment, the first network element and the second network element may pre-agree on and pre-store the second challenge value in the second network element. When the second network element needs to initiate the verification request to the first network element to request to verify whether the first network element is trusted, the second network element does not need to generate the challenge value or reuse the challenge value, but the second flag is used to trigger the first network element to generate the second response information.

With reference to the second aspect, in some implementations of the second aspect, the first response information includes a sixth field, and the sixth field indicates a length of the attestation information or the attestation result.

In this embodiment, in the data packet, the attestation information may occupy only a part of the fifth field, and length information of the attestation information or the attestation result is stored in the sixth field, to help the first network element read a field occupied by the attestation information or the attestation result in the fifth field, and reduce reading time and resource overheads.

According to a third aspect, a communication apparatus is provided, including: a sending unit, configured to send a first data packet, where the first data packet includes first request information, and the first request information is used to request to verify whether a second network element is trusted; and a receiving unit, configured to receive a second data packet, where the second data packet includes first response information, and the first response information is used to verify whether the second network element is trusted.

With reference to the third aspect, in some implementations of the third aspect, the first request information includes a first field, the first field is a first flag, and the first flag is used to trigger the second network element to generate the first response information.

With reference to the third aspect, in some implementations of the third aspect, the first flag is used to identify that the first request information includes a first challenge value, and the first challenge value is used to generate the first response information.

With reference to the third aspect, in some implementations of the third aspect, the first request information includes a second field, and the second field includes the first challenge value.

With reference to the third aspect, in some implementations of the third aspect, the first challenge value is any one of a first random number, a second random number, a timestamp, and a value of an agreed field.

With reference to the third aspect, in some implementations of the third aspect, the value of the agreed field is a sequence number of the first data packet.

With reference to the third aspect, in some implementations of the third aspect, the first request information includes a third field, and the third field includes a length of the first challenge value.

With reference to the third aspect, in some implementations of the third aspect, the first response information includes a fourth field, the fourth field is a second flag, and the second flag is used to identify that the second data packet includes attestation information or an attestation result. The attestation information is generated based on the first challenge value by the second network element, and the attestation result includes a result that the second network element is attested to be trusted.

With reference to the third aspect, in some implementations of the third aspect, the attestation result includes one or more of identity information, trusted content, and freshness. The identity information indicates an identity of a verifier who verifies that the second network element is trusted, the trusted content indicates content that is verified to be trusted and that is of the second network element, and the freshness indicates time at which the second network element is verified to be trusted.

With reference to the third aspect, in some implementations of the third aspect, the first response information includes a fifth field, and the fifth field includes the attestation information or the attestation result.

With reference to the third aspect, in some implementations of the third aspect, the fifth field includes a second challenge value, the second challenge value is used by a first network element to generate second response information, and the second response information is used to verify whether the first network element is trusted.

With reference to the third aspect, in some implementations of the third aspect, the second challenge value is any one of a third random number, a fourth random number, a timestamp, and a value of an agreed field.

With reference to the third aspect, in some implementations of the third aspect, the value of the agreed field is a sequence number of the second data packet.

With reference to the third aspect, in some implementations of the third aspect, the second flag is further used to trigger the first network element to generate the second response information.

With reference to the third aspect, in some implementations of the third aspect, the second flag is further used to identify that the first response information includes the second challenge value.

With reference to the third aspect, in some implementations of the third aspect, the first response information includes a sixth field, and the sixth field indicates a length of the attestation information or the attestation result.

According to a fourth aspect, a communication apparatus is provided, including: a receiving unit, configured to receive a first data packet, where the first data packet includes first request information, and the first request information is used to request to verify whether a second network element is trusted; and a sending unit, further configured to send a second data packet, where the second data packet includes first response information, and the first response information is used to verify whether the second network element is trusted.

With reference to the fourth aspect, in some implementations of the fourth aspect, the first request information includes a first field, the first field is a first flag, and the first flag is used to trigger the second network element to generate the first response information.

With reference to the fourth aspect, in some implementations of the fourth aspect, the first flag is used to identify that the first request information includes a first challenge value, and the first challenge value is used to generate the first response information.

With reference to the fourth aspect, in some implementations of the fourth aspect, the request information includes a second field, and the second field includes the first challenge value.

With reference to the fourth aspect, in some implementations of the fourth aspect, the first challenge value is any one of a first random number, a second random number, a timestamp, and a value of an agreed field.

With reference to the fourth aspect, in some implementations of the fourth aspect, the value of the agreed field is a sequence number of the first data packet.

With reference to the fourth aspect, in some implementations of the fourth aspect, the request information includes a third field, and the third field includes a length of the first challenge value.

With reference to the fourth aspect, in some implementations of the fourth aspect, the response information includes a fourth field, the fourth field is a second flag, and the second flag is used to identify that the second data packet includes attestation information or an attestation result. The attestation information is generated based on the first challenge value by the second network element, and the attestation result includes a result that the second network element is attested to be trusted.

With reference to the fourth aspect, in some implementations of the fourth aspect, the response information includes a fifth field, and the fifth field includes the attestation information or the attestation result.

With reference to the fourth aspect, in some implementations of the fourth aspect, the attestation result includes one or more of identity information, trusted content, and freshness. The identity information indicates an identity of a verifier who verifies that the second network element is trusted, the trusted content indicates content that is verified to be trusted and that is of the second network element, and the freshness indicates time at which the second network element is verified to be trusted.

With reference to the fourth aspect, in some implementations of the fourth aspect, the fifth field includes a second challenge value, the second challenge value is used by a first network element to generate second response information, and the second response information is used by the second network element to verify whether the first network element is trusted.

With reference to the fourth aspect, in some implementations of the fourth aspect, the second challenge value is any one of a third random number, a fourth random number, a timestamp, and a value of an agreed field.

With reference to the fourth aspect, in some implementations of the fourth aspect, the value of the agreed field is a sequence number of the second data packet.

With reference to the fourth aspect, in some implementations of the fourth aspect, the second flag is further used to trigger the first network element to generate the second response information.

With reference to the fourth aspect, in some implementations of the fourth aspect, the second flag is further used to identify that the first response information includes the second challenge value.

With reference to the fourth aspect, in some implementations of the fourth aspect, the response information includes a sixth field, and the sixth field indicates a length of the attestation information or the attestation result.

According to a fifth aspect, a communication system is provided. The system includes the apparatus in any one of the first aspect or the possible implementations of the first aspect and the apparatus in any one of the second aspect or the possible implementations of the second aspect.

According to a sixth aspect, a computer program product is provided. The computer program product includes: a computer program or a group of instructions. When the computer program or the group of instructions are run on a computer, the method in any one of the first aspect or the possible implementations of the first aspect is performed.

According to a seventh aspect, a computer program product is provided. The computer program product includes: a computer program or a group of instructions. When the computer program or the group of instructions are run on a computer, the method in any one of the second aspect or the possible implementations of the second aspect is performed.

According to an eighth aspect, a computer-readable medium is provided, configured to store a computer program. The computer program includes instructions used to perform the method in any one of the first aspect or the possible implementations of the first aspect.

According to a ninth aspect, a computer-readable medium is provided, configured to store a computer program. The computer program includes instructions used to perform the method in any one of the second aspect or the possible implementations of the second aspect.

According to a tenth aspect, a chip is provided, including a processor, configured to invoke, from a memory, and run instructions stored in the memory, so that a communication apparatus on which the chip is disposed performs the method in any one of the first aspect or the possible implementations of the first aspect.

In a possible implementation, the processor and the memory are integrated together.

In another possible implementation, the memory is located outside the communication apparatus.

The communication apparatus further includes a communication interface. The communication interface is for communication between the communication apparatus and another device, for example, for data and/or signal sending or receiving. For example, the communication interface may be a transceiver, a circuit, a bus, a module, or a communication interface of another type.

According to an eleventh aspect, a chip is provided, including a processor, configured to invoke, from a memory, and run instructions stored in the memory, so that a communication apparatus on which the chip is disposed performs the method in any one of the second aspect or the possible implementations of the second aspect.

In a possible implementation, the processor and the memory are integrated together.

In another possible implementation, the memory is located outside the communication apparatus.

The communication apparatus further includes a communication interface. The communication interface is for communication between the communication apparatus and another device, for example, for data and/or signal sending or receiving. For example, the communication interface may be a transceiver, a circuit, a bus, a module, or a communication interface of another type.

According to a twelfth aspect, a communication apparatus is provided. The apparatus includes at least one processor, and the at least one processor is configured to execute a program or instructions to enable the communication apparatus to perform the method in any one of the first aspect or the possible implementations of the first aspect.

According to a thirteenth aspect, a communication apparatus is provided. The apparatus includes at least one processor, and the at least one processor is configured to execute a program or instructions to enable the communication apparatus to perform the method in any one of the second aspect or the possible implementations of the second aspect.

DETAILED DESCRIPTION OF EMBODIMENTS

Figure 1:
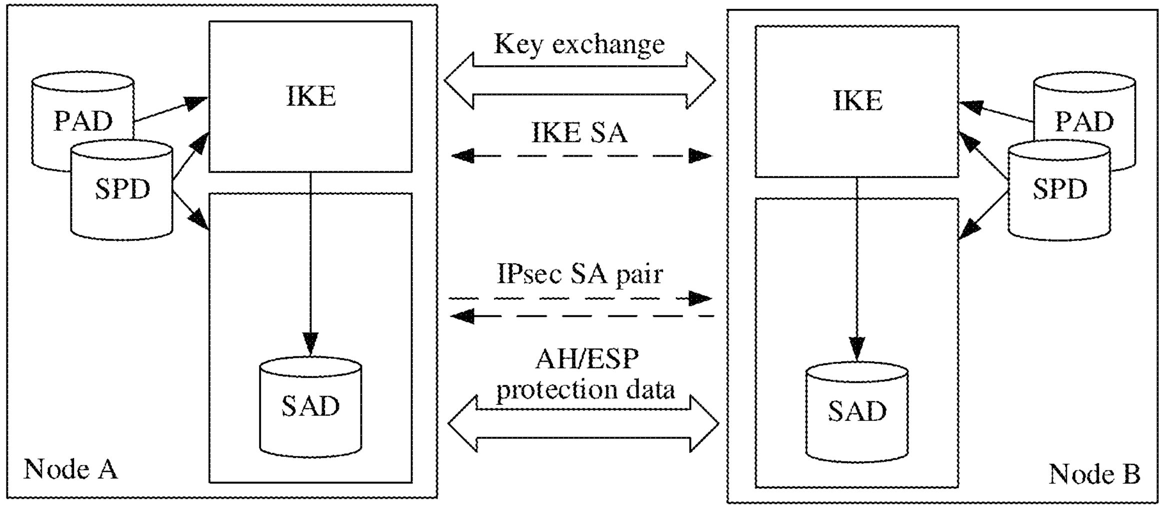
FIG. 1 is a diagram of a system architecture of an IPsec protocol.

The following describes the embodiments with reference to the accompanying drawings.

The embodiments may be applied to various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a future 6th generation (6G) system.

A network element in the embodiments may be a device configured to communicate with a terminal device. The network element may be a base transceiver station (BTS) in a global system for mobile communications (GSM) or code division multiple access (CDMA), or may be a NodeB (NB) in a wideband code division multiple access (WCDMA) system, or may be an evolved NodeB (eNB) in an LTE system, or may be a radio controller in a cloud radio access network (CRAN) scenario. Alternatively, the network device may be a relay station, an access point, a vehicle-mounted device, a wearable device, a network device in a communication network such as a 5G network and a future 6G network, or a network device or a functional unit in a public land mobile network (PLMN). This is not limited in the embodiments.

In the embodiments, "indicate" may include "directly indicate" and "indirectly indicate". When a piece of indication information indicates A, the indication information may directly indicate A or indirectly indicate A, but it does not indicate that the indication information definitely carries A. In the embodiments, descriptions such as "when . . . ", "in a case of . . . ", and "if" all mean that a device performs corresponding processing in an objective case, and are not limited to time, and the device is not required to perform a determining action during implementation. This does not mean that there is another limitation.

In the embodiments, unless otherwise specified, a quantity of nouns indicates "a singular noun or a plural noun", such as "one or more". "At least one" means one or more, "a plurality of" means two or more, and similarly, "a plurality of types" in "one or more types" means two or more types. "And/or" describes an association relationship between associated objects and represents that three relationships may exist. For example, A and/or B may represent the following cases: only A exists, both A and B exist, and only B exists, where A and B may be singular or plural. The character "/" may indicate an "or" relationship between the associated objects. For example, A/B indicates A or B. "At least one of the following items (pieces)" or a similar expression thereof means any combination of these items, including any combination of singular items (pieces) or plural items (pieces). For example, at least one (piece) of a, b, or c represents: a, b, c, a and b, a and c, b and c, or a, b, and c, where a, b, and c may be singular or plural.

For ease of understanding of the embodiments, concepts are first briefly described.

1. Trusted computing (TC) is a technology that aims to enable a computer to always run as expected. "Trusted" emphasizes that a behavior result is predictable and controllable. The trusted computing is enforced by computer hardware and software. A trusted technology for a computing system starts with a root of trust and develops to trusting a hardware platform, an operating system, and an application. Management and authentication strength of each layer corresponds to trustworthiness of each layer. Further, the trustworthiness is extended to the complete computer system, and a protection measure is taken to ensure integrity of computer resources and expected computer behavior, to improve the trustworthiness of the computer system.

Two different research directions occur since the development of the trusted computing. One is to use a physical anti-tampering device to ensure that a trusted computing base (TCB) is trusted and use the TCB as a trusted anchor to build a trusted computing architecture for the computer system. The other one is to build an isolated computing system to ensure that a running environment of sensitive software code is trusted. Based on this idea, a universal trusted execution environment (TEE) based on a special security mode of a central processing unit (CPU) is developed.

2. Remote attestation (RA) is one of key technologies in an overall solution for the trusted computing and is used to determine whether a device is trusted. The remote attestation enables a user or another person to detect a change of a computer of the user. In this way, private information or an important command is not sent to an insecure computer or a security-compromised computer. In a remote attestation mechanism, a certificate is generated by using hardware, to declare which software is running. The user may send the certificate to a remote party to indicate that the computer of the user is not tampered with. The remote attestation may be combined with public key encryption to ensure that sent information can be read only by a program that sends an attestation request rather than another eavesdropper. These restrictions are used to achieve objectives of enhancing terminal trustworthiness and improving system security. Currently, a remote attestation technology may use the following several solutions:

(1) Privacy certificate authority (PCA): A verifier (which may also be referred to as a challenger) sends a challenge to a trusted computing platform (TPM), in other words, requests content of one or more platform configuration registers (PCRs). A platform collects and stores a measurement log file. The TPM signs the content of the PCR by using an identity key. The platform sends a message to a certificate authority (CA) to request a platform certificate, and sends the platform certificate, a storage measurement log (event_log), and the PCR with a signature to the verifier. The verifier attests the request, recalculates the storage measurement log and compares the storage measurement log with a received PCR value, to verify the platform certificate and the signature.

(2) Direct anonymous attestation (DAA): The TPM selects one piece of secret information, and obtains, through secure "zero-knowledge proof", a DAA certificate issued by a DAA issuer for the secret information. The verifier proves, through the "zero-knowledge proof", that the TPM has a valid DAA certificate.

(3) Intel software guard extensions (Intel SGX) cross-platform verification: An SGX technology enables a developer to divide an application into a hardened enclave of a CPU or an executable protected area in a memory, to improve security even on an attacked platform. An Intel SGX solution is approximately as follows: An authenticated enclave obtains current information to generate a report structure, generates a tag by using a report key of a quote enclave, and sends the report structure and the tag to the quote enclave. The quote enclave verifies whether the authenticated enclave and the quote enclave are on a same platform (for example, a same device), encapsulates the received report structure into a quote structure, and signs the quote structure by using a signature key. A target enclave verifies whether a quote is generated by a reliable Intel processor.

3. An internet protocol security (IPsec) protocol is a protocol set defined by the internet engineering task force (IETF). Communication parties use manners such as encryption, integrity check, and data source authentication at an internet protocol (IP) layer, to ensure confidentiality, integrity, and anti-replay of an IP data packet transmitted on a network.

4. An internet key exchange (IKE) protocol is a hybrid protocol that implements Oakley key exchange and secure key exchange (SKEME) in an internet security association and key management protocol (ISAKMP) framework. Both Oakley and the SKEME define a key exchange method, including a structure of payload, payload of transmitted information, a key processing step, and how to use a key.
5. A packet authentication header (AH) protocol is a protocol in an IPsec system architecture. The protocol is used to provide connectionless integrity and data source authentication for internet protocol (IP) data and provide protection to avoid replay.
6. An encapsulating security payload (ESP) protocol is a protocol in the IPsec system architecture. The protocol is used in a transmission mode and a tunnel mode. The protocol uses an encryption and verification mechanism, to provide data source verification, data integrity, anti-replay, and a confidentiality security service for the IP data packet. IPsec ESP provides confidentiality and integrity by encrypting data that needs to be protected, and placing encrypted data in a data part of IPsec ESP. Based on a user security requirement, the protocol may be used to encrypt a segment at a transmission layer, for example, a transmission control protocol (TCP), a user datagram protocol (UDP), an internet control message protocol (ICMP), and an internet group management protocol (IGMP), and may be used to encrypt the entire IP data packet.
7. Security association (SA): The SA is used to encode a policy protocol between two computers and specify algorithms and a key length to be used by the computers, and an actual key. The SA is unidirectional and is used to establish a logical connection between two entities using IPsec, for example, hosts or routers, and define how to use a security service (for example, encryption) for communication between the entities.
8. A security association database (SAD) is used to store information related to an established SA.
9. A security policy (SP) is configured by a user, and several policies are defined to describe how to process IP data flows, for example, transparently transmit, discard, or perform IPsec encryption and decryption.
10. A security policy database (SPD) is used to store an SP of a node. The database may be an ordered structure that describes a data flow characteristic by using an access control list. When an IP packet is received or to be sent, the SPD needs to be searched first to determine how to process the packet. There are three possible processing manners: discarding, not using IPsec, and using IPsec. When IPsec needs to be used, corresponding information is further searched for in the SAD.
11. A security parameter index (SPI) is a 32-bit (bit) value and is used to uniquely identify an SA.

FIG. 1 is a diagram of a system architecture of an IPsec protocol. A security policy (SP) and a security association (SA) are stored by an SPD and an SAD of a node A and an SPD and an SAD of a node B respectively. The SA may be regarded as a unidirectional logical connection established at a network layer. To provide a service, IPsec needs to establish the SA first. An IKE protocol is used to establish and manage the SA. The IKE protocol is run, so that the node A and the node B complete key exchange, and establish two SAs from the node A to the node B and from the node B to the node A. In this way, bidirectional IPsec communication can be performed between the node A and the node B. Then, an AH or ESP transmission protocol uses a key obtained through IKE to provide services such as connectionless data integrity, anti-replay, data confidentiality, and limited communication traffic confidentiality for communication between the node A and the node B. A peer authorization database (PAD) indicates an authentication method of a peer end, for example, presetting or IKE negotiation.

Figure 2:
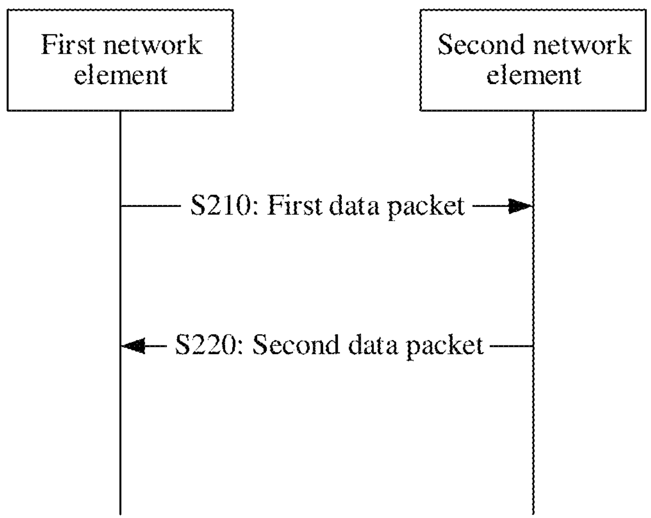
FIG. 2 is an interaction diagram of a communication method integrated with trustworthiness measurement according to an embodiment.

FIG. 2 is an interaction diagram of a communication method integrated with trustworthiness measurement according to an embodiment.

S210: A first network element sends a first data packet, and correspondingly, a second network element receives the first data packet.

The first network element sends the first data packet, where the first data packet includes first request information, and the first request information is used to request to verify whether the second network element is trusted.

In this embodiment, the first network element sends the data packet including the first request information to the second network element, to trigger the second network element to perform trustworthiness measurement and generate first response information. The first response information may include attestation information or an attestation result, and the first response information is used by the first network element to verify whether the second network element is trusted, to improve security of communication between the first network element and the second network element and improve security of the first network element and the second network element.

In a possible implementation, the first request information includes a first field, the first field is a first flag, and the first flag is used to trigger the second network element to generate the first response information.

In this embodiment, the first flag may be located in a packet header of the first data packet. A part of a reserved field in the packet header of the first data packet is set to 1 and used as a flag, to trigger the second network element to generate the first response information. The first data packet may not include a challenge value (challenge data), and the challenge value may be pre-agreed on by the first network element and the second network element and pre-stored in the first network element and/or the second network element. When receiving the first data packet including the flag, the second network element triggers generation of the first response information.

In a possible implementation, the first flag may be further used to identify that the first request information includes a first challenge value.

In this embodiment, the first request information may include the first flag and the first challenge value, the first flag is used to identify that the first request information includes the first challenge value, and the first challenge value triggers the second network element to generate the first response information.

Optionally, the first flag may alternatively be located in a packet body of the first data packet or may be located in another field having a reserved field. For example, the first flag may be located in a reserved field in a next payload field in the packet header of the data packet.

In a possible implementation, the first request information includes a second field, the second field includes the first challenge value, and the first challenge value is used by the second network element to generate the first response information.

In this embodiment, the first network element and the second network element may not pre-agree on the challenge value. The first network element generates the first challenge value based on an actual requirement, stores the first challenge value in the first data packet, and initiates a verification request to the second network element. The second network element generates the first response information based on the first challenge value.

In a possible implementation, the first challenge value is any one of a first random number, a second random number, a timestamp, and a value of an agreed field.

The first random number may be a random number provided by a trusted third party, where the trusted third party is a third party trusted by both the first network element and the second network element. The second random number is a random number generated by the first network element to verify whether the second network element is trusted. The timestamp may be clock information. The clock information may be a trusted clock trusted by both the first network element and the second network element, for example, clock information generated by a clock endorsed by an endorser. Endorsement is to attest that a platform is trusted. For example, an endorsement key (EK) is written to identify a unique identity of the platform, to attest that the platform is trusted. The value of the agreed field may be any $X^{th}$ to $Y^{th}$ bit data that is in any protocol such as an IPsec protocol and that is pre-agreed on by the first network element and the second network element.

In a possible implementation, the value of the agreed field may be a sequence number of the first data packet.

In this embodiment, the first network element may reuse the first random number, the timestamp, the value of the agreed field, the sequence number of the first data packet, or the like as the challenge value, and does not need to generate a random number as the challenge value for performing trustworthiness measurement on the second network element, so that resource overheads can be reduced. The first network element may alternatively generate the challenge value and select the challenge value based on an actual situation, so that flexibility of initiating trustworthiness verification by the first network element can be improved.

In a possible implementation, the request information includes a third field, and the third field includes a length of the first challenge value.

In this embodiment, in the data packet, the first challenge value may occupy only a part of the second field, and length information of the challenge value is stored in the third field, to help the second network element read a field occupied by the challenge value in the second field and reduce reading time and resource overheads.

S220: The first network element receives a second data packet, and correspondingly, the second network element sends the second data packet.

The first network element receives the second data packet, where the second data packet includes the first response information, and the first response information is used by the first network element to verify whether the second network element is trusted.

In this embodiment, the second network element responds to the request information of the first network element, so that the first network element can verify whether the second network element is trusted, to improve security of a communication process between the first network element and the second network element and improve the security of the first network element and the second network element.

In a possible implementation, the first response information includes a fourth field, the fourth field is a second flag, and the second flag is used to identify that the second data packet includes the attestation information or the attestation result. The attestation information is generated by the second network element based on the challenge value, and the attestation result includes a result that the second network element is verified to be trusted.

In this embodiment, the data packet includes the second flag, to help the first network element learn that the second data packet includes valid information used for trustworthiness measurement, read the first response information, and verify, based on the first response information, whether the second network element is trusted, thereby avoiding a problem such as a packet loss.

In a possible implementation, the first response information includes a fifth field, the fifth field includes the attestation information, and the attestation information includes a quote and a measurement log. The measurement log is process information for performing trustworthiness measurement by the second network element, and the quote includes a digest of the measurement log.

Optionally, the attestation information may further include a measurement value, and the measurement value is information about whether the second network element is trusted.

Optionally, the attestation information may further include a trusted signature, and the trusted signature is a signature of the second network element for the measurement value.

In this embodiment, the first network element may verify the trusted signature based on the corresponding challenge value, and determine that the trusted signature is generated by the second network element based on the challenge value, to verify whether the second network element is trusted, determine validity of the measurement log based on the measurement, and verify integrity of the measurement log based on the digest of the measurement log, thereby helping improve the security of the communication process.

In a possible implementation, the fifth field includes the attestation result, and the attestation result includes one or more of identity information, trusted content, and freshness. The identity information indicates an identity of a verifier who attests that the second network element is trusted, the trusted content indicates content that is attested to be trusted and that is of the second network element, and the freshness indicates time at which the second network element is attested to be trusted.

The first network element may determine, based on the identity information, the identity of the verifier who makes the attestation result, may determine, based on the trusted content, trusted content verified by the verifier in a trustworthiness attestation process and whether the trusted content is applicable to the current trustworthiness verification process, and may determine, based on the freshness, time at which another verifier makes the attestation result, to determine whether the attestation result is within a validity period and determine whether trustworthiness verification needs to be performed again.

In this embodiment, the second network element may store an attestation result obtained by verifying whether the second network element is trusted by another verifier. When receiving the first data packet of the first network element, the second network element sends the attestation result and does not need to repeatedly generate the attestation information, so that resource overheads are reduced.

In a possible implementation, the fifth field includes a second challenge value, the second challenge value is used by the first network element to generate second response information, and the second response information is used to verify whether the first network element is trusted.

Similarly, the second response information may include attestation information or an attestation result of the first network element.

In this embodiment, when the second network element is used as an attester to generate the response information, the second network element may also be used as a verifier to initiate a verification request to the first network element, to request to verify whether the first network element is trusted. Therefore, bidirectional verification is performed, thereby improving the security of communication between the first network element and the second network element and improving the security of the first network element and the second network element.

In a possible implementation, the second challenge value is any one of a third random number, a fourth random number, a timestamp, and a value of an agreed field. The third random number is a random number provided by a trusted third party, and the trusted third party is a third party trusted by both the first network element and the second network element. The fourth random number is a random number generated by the second network element to verify whether the first network element is trusted. The third random number and the first random number may be a same value, and the third random number and the first random number may also be referred to as trusted random numbers.

In this embodiment, the second network element may reuse the third random number, the timestamp, or the value of the agreed field as the challenge value and does not need to generate the challenge value for performing trustworthiness measurement, so that resource overheads can be reduced.

Optionally, the second challenge value may alternatively be a random number generated by the second network element to perform trustworthiness verification on the first network element.

In a possible implementation, the second flag further indicates that the first response information includes the second challenge value.

In this embodiment, when the second network element needs to perform trustworthiness verification on the first network element, the first response information may include the second challenge value and the second flag. The second flag indicates that the first response information includes the second challenge value, and the second challenge value is used to trigger the first network element to generate the second response information. In this case, the second network element performs bidirectional verification with the first network element, to further improve the security of communication between the first network element and the second network element.

In a possible implementation, the second flag is further used to trigger the first network element to generate the second response information.

In this embodiment, when the second network element needs to perform trustworthiness verification on the first network element, the first response information may include the second flag but does not include the second challenge value, and the second flag is used to trigger the first network element to generate the second response information. The second challenge value may be pre-agreed on by the first network element and the second network element and pre-stored in the first network element and/or the second network element. When receiving a verification request of the second network element, the first network element generates the second response information based on the pre-stored challenge value.

In a possible implementation, the first response information includes a sixth field, and the sixth field indicates a length of the attestation information or the attestation result.

In this embodiment, in the data packet, the attestation information may occupy only a part of the fifth field, and length information of the attestation information or the attestation result is stored in the sixth field, to help the first network element read a field occupied by the attestation information or the attestation result in the fifth field, and reduce reading time and resource overheads.

Figures 3, 4:
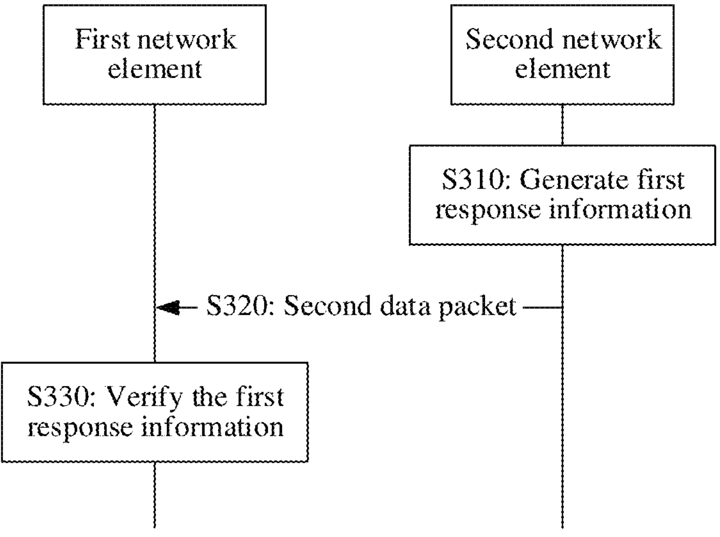
FIG. 3 is an interaction diagram of another communication method integrated with trustworthiness measurement according to an embodiment.
FIG. 4 is a diagram of a structure of a packet header of an AH protocol data packet to which an embodiment is applicable.

FIG. 3 is an interaction diagram of another communication method integrated with trustworthiness measurement. As shown in FIG. 3, a first network element does not need to send a first data packet including first request information to a second network element, and the second network element actively generates first response information and sends a second data packet including the first response information, so that the first network element verifies whether the second network element is trusted.

S310: The second network element generates the first response information.

In a possible implementation, the second network element may actively generate the first response information based on a timing mechanism, a counting mechanism, an event trigger mechanism, or the like, so that the first network element verifies whether the second network element is trusted, and the first response information is stored in the second data packet.

Optionally, the second network element is triggered, based on the timing mechanism, to actively generate the first response information, in other words, after a timer times to agreed time, the second network element actively generates the first response information.

Optionally, the second network element is triggered, based on the counting mechanism, to actively generate the first response information, in other words, after a counter counts to an agreed value, the second network element actively generates the first response information.

Optionally, the second network element actively generates the first response information based on the event trigger mechanism, in other words, when a preset event occurs, the second network element is triggered to actively generate the first response information. For example, it may be preset that when another verifier sends an attestation result for the second network element to the second network element, the second network element is triggered to actively generate the first response information for the first network element.

In this embodiment, the second network element actively generates a first response information, and the first network element does not need to send the first data packet including the first request information to trigger the second network element to generate the first response information, so that signaling overheads can be reduced.

S320: The second network element sends the second data packet to the first network element.

The second network element may actively send the second data packet to the first network element based on the timing mechanism, the counting mechanism, the event trigger mechanism, or the like, where the second data packet includes the first response information.

In a possible implementation, the first response information includes attestation information, and the attestation information is generated by the terminal device based on a first challenge value.

Optionally, the first challenge value may be a trusted random number, a timestamp, or a value of an agreed field.

Optionally, the value of the agreed field may be a sequence number of the first data packet.

In this embodiment, the first challenge value may be pre-agreed on by the second network element and the first network element and pre-stored in the terminal device, and the second network element is triggered, based on the timing mechanism, the counting mechanism, or the like, to actively generate the first response information based on the challenge value. The first network element does not need to send the first data packet to trigger the second network element to generate the first response information, so that signaling overheads can be reduced.

In a possible implementation, the attestation information includes a quote and a measurement log. The measurement log is measurement process information of a trusted computing platform supported by the second network element, and the quote includes a digest of the measurement log, where the digest of the measurement log is obtained by performing hash calculation on the measurement log.

Optionally, the attestation information may further include a measurement value, and the measurement value is information about whether the terminal device is trusted.

Optionally, the attestation information may further include a trusted signature, and the trusted signature is a signature of the terminal device for the measurement value.

Optionally, the attestation information may further include a running status, a health degree, security-related configuration or construction information, hardware, firmware, software, a file system, an attestation environment identity, a trusted execution environment, and data integrity of the terminal device.

In a possible implementation, the first response information includes an attestation result, and the attestation result includes one or more of identity information, trusted content, and freshness.

S330: The first network element verifies the first response information of the second network element.

In a possible implementation, the first response information includes the attestation information, and the attestation information is generated by the second network element based on the first challenge value.

The first network element decrypts the trusted signature based on an attestation public key and the first challenge value, verifies whether the attestation information is generated by the second network element, and compares a measurement value obtained through decryption with a trustworthiness attestation reference value, to verify whether the second network element is trusted, and verify whether the measurement log is valid.

In another possible implementation, the first response information includes the attestation result, and the attestation result includes one or more of the identity information, the trusted content, and the freshness.

The first network element may determine, based on the identity information, an identity of a verifier who makes the attestation result, may determine, based on the trusted content, trusted content verified by the verifier in a trustworthiness attestation process and whether the trusted content is applicable to the current trustworthiness verification process, and may determine, based on the freshness, time at which another verifier makes the attestation result, to determine whether the attestation result is within a validity period and determine whether trustworthiness verification needs to be performed again.

Optionally, the attestation result may further include one or more of the following information: a configuration, an executable file, a file system, hardware, attestation environment identity, source data, and storage opaque.

In this embodiment, before the first network element requests to verify whether the second network element is trusted, another verifier has verified whether the second network element is trusted and sends an attestation result to the second network element. The second network element may directly send the attestation result to the first network element, and does not need to repeatedly generate attestation information, so that air interface resources can be saved.

In a possible implementation, the another verifier sends the attestation result to a trusted third party, and the trusted third party stores the attestation result. The trusted third party is a third party trusted by both the first network element and the second network element. When the first network element requests to verify whether the second network element is trusted, the trusted third party sends the attestation result to the first network element.

In this embodiment, the first network element directly checks the attestation result, and does not need to verify the attestation information one by one, so that resource overheads can be reduced.

An IPsec protocol is used as an example. To implement the communication method integrated with trustworthiness measurement described in FIG. 2 or FIG. 3, related information of trustworthiness measurement may be added to a packet header or a packet body of a data packet such as an AH protocol data packet, an IKE protocol data packet, or an ESP protocol data packet, so that a communication entity can perform trustworthiness measurement in a process of establishing a communication channel, to improve security of a communication process and the communication entity.

FIG. 4 is a structure of a packet header of an AH data packet. The structure of the AH packet header may include the following fields:

A next payload header (next header) field is used to identify a type of a next payload, and a size of the next payload header field may be 8 bits. For example, if a value of the next payload header field is 6, the next payload of the AH packet header is TCP.

A payload length field indicates a length of the packet header, and a size of the payload length field may be 8 bits. A value of the payload length field is obtained by subtracting 2 from a length of entire AH data in a unit of 32 bits, such as 4 bytes. The AH data includes original AH packet header data and added authentication data.

A reserved field is a preset reserved bit of a protocol and is reserved for future use based on an actual requirement. In a conventional technology, a value of the reserved field is set to 0 during sending, and a size of the reserved field may be 16 bits.

A security parameter index (SPI) field is used to distinguish between SAs, and values of the security parameter index field and the SAs are in one-to-one correspondence. If the value of the security parameter index field is 0, it indicates that there is no SA, and a size of the security parameter index field may be 32 bits.

A sequence number field is used to store a sequence number of the data packet, and a value of the sequence number field increases from 1, to ensure real-time sending of the current data packet and avoid a replay attack of the data packet. A size of the sequence number field may be 32 bits.

An authentication data field includes an integrity check value (ICV), which may also be referred to as a message identity verification code and is used to verify identity and integrity of a message. The ICV is calculated based on an IP packet header, an AH packet header, and IP payload. After receiving the data packet, a receiving end performs hash calculation and compares a calculation value with this value. If the calculation value is equal this value, it indicates that the data is integrated. AH provides identity verification, integrity, and anti-replay for the entire data packet (the IP packet header and data payload in the data packet).

If a verifier sends the AH data packet to an attester (which may also be referred to as a challenged user), and includes, in the AH data packet, request information for performing trustworthiness verification on the attester, the structure of the packet header of the AH data packet may be structures described in FIG. 5 to FIG. 9.

Figure 5:
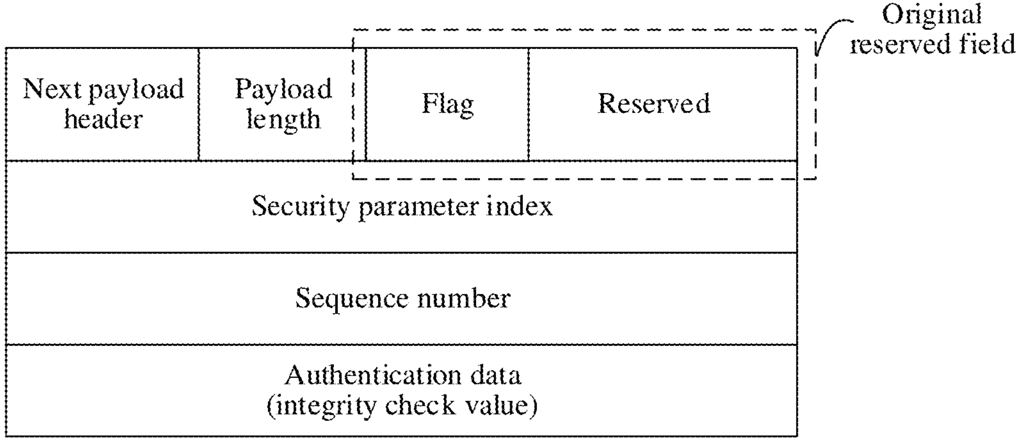
FIG. 5 is a diagram of a structure of a packet header of an AH protocol data packet according to an embodiment.

FIG. 5 is a diagram of a structure of a packet header of an AH data packet according to an embodiment. As shown in FIG. 5, a reserved field in the packet header of the AH data packet is reused, and a part of the reserved field is split to serve as a flag.

In a possible implementation, the flag is used to trigger an attester to generate trusted response information, and the trusted response information is used by a verifier to verify whether the attester is trusted.

The packet header and a packet body of the AH data packet may not include a first challenge value, where the attester may use the first challenge value to generate the trusted response information, and the first challenge value may be pre-agreed on by the verifier and the attester and pre-stored in the verifier and/or the attester. The packet header of the sent AH data packet includes the flag, and the flag is used to trigger the attester to generate the trusted response information.

Optionally, one bit is selected from the reserved field as a flag field, and if the bit is 1, the attester is triggered to generate the trusted response information.

Optionally, two bits are selected from the reserved field as the flag field. For example, if the bits are 01, the attester is triggered to generate the trusted response information.

In this embodiment, that one bit or two bits are selected as the flag is only used as an example. However, a quantity of bits occupied by the flag is not limited.

In another possible implementation, the flag is used to identify that the AH data packet includes a first challenge value, and the challenge value is used by an attester to generate trusted response information.

Optionally, one bit is selected from a reserved field as a flag field, and if the bit is 1, it indicates that the AH data packet includes the first challenge value.

Optionally, two bits are selected from the reserved field as the flag field. For example, if the bits are 01, it indicates that the AH data packet includes the first challenge value.

Optionally, the first challenge value may be stored in the packet header of the AH data packet. A trusted data field is newly added following an authentication data field and is used to store the first challenge value. The structure of the packet header of the AH data packet may be a structure shown in FIG. 6.

The first challenge value may be any one of a trusted random number, a timestamp, and a value of an agreed field.

The trusted random number is a random number provided by a trusted third party trusted by both the verifier and the attester, and when being used as the first challenge value, the trusted random number may be stored in the trusted data field.

The timestamp is a trusted clock trusted by both the verifier and the attester, for example, clock information generated by a clock endorsed by an endorser, and when being used as the first challenge value, the timestamp may be stored in the trusted data field.

The value of the agreed field may be a value of any field that is in an AH protocol and that is pre-agreed on by the verifier and the attester.

For example, the value of the agreed field may be a sequence number of the AH data packet, where the sequence number of the AH data packet is a sequence number of an AH data packet sent in real time when the verifier initiates trustworthiness verification to the attester, and the verifier reuses the sequence number of the data packet sent this time as the first challenge value. The trusted data field may not be newly added to the AH data packet, in other words, the first challenge value is directly stored in a sequence number field, and the flag is used to identify that the data packet includes the first challenge value. When reading the sequence number field, the attester may know that a trusted response needs to be made.

The first challenge value may alternatively be a random number generated by the verifier to perform trustworthiness verification on the attester, and the random number may be stored in the trusted data field.

Optionally, the first challenge value may be further used to avoid a replay attack of a current verification request.

Figure 7:
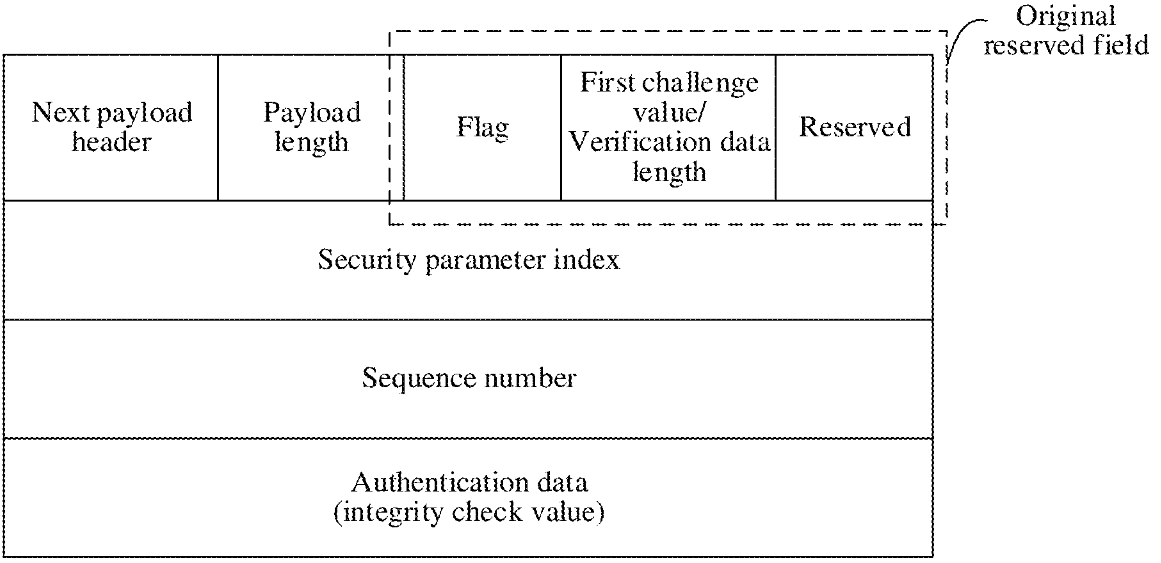
FIG. 7 is a diagram of a structure of still another packet header of an AH protocol data packet according to an embodiment.

Optionally, the packet header of the AH data packet may further include a first challenge value length field that indicates a length of the first challenge value. The first challenge value may be stored in the packet body of the AH data packet, and the trusted data field is newly added at any position in the packet body of the AH data packet, to store the first challenge value. In other words, the packet header of the AH data packet includes the flag and the first challenge value length field, and the structure of the packet header of the AH data packet is shown in FIG. 7.

Optionally, the first challenge value length field may alternatively be stored in the packet body of the AH data packet.

Figure 8:
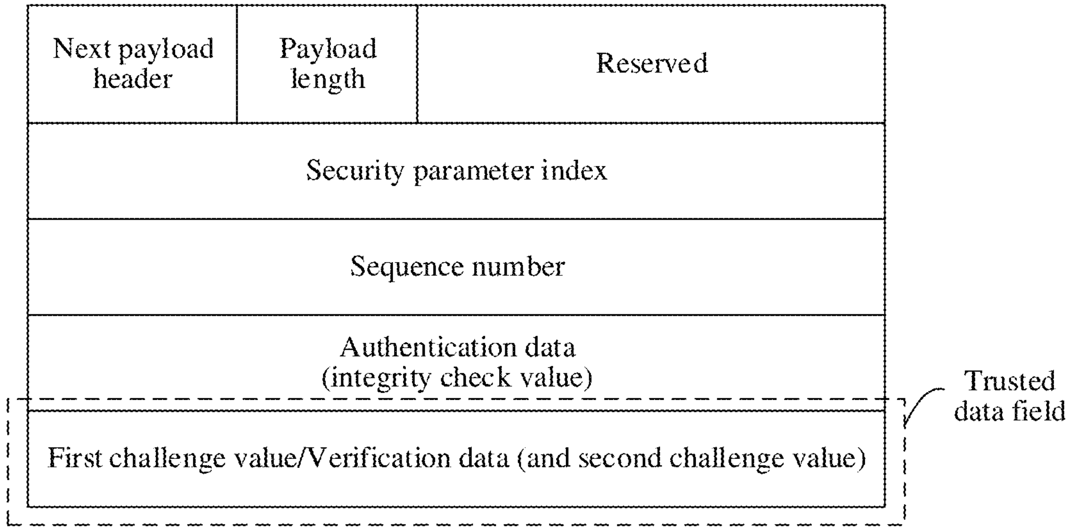
FIG. 8 is a diagram of a structure of still another packet header of an AH protocol data packet according to an embodiment.

FIG. 8 is a diagram of a structure of still another packet header of an AH data packet according to an embodiment. As shown in FIG. 8, the packet header of the AH data packet may include only a trusted data field, used to store a first challenge value.

Optionally, the first challenge value may be any one of a trusted random number, a timestamp, a value of an agreed field, or a random number generated by a verifier.

Optionally, any position in a packet body of the AH data packet may further include a challenge value length field.

Figures 9, 10:
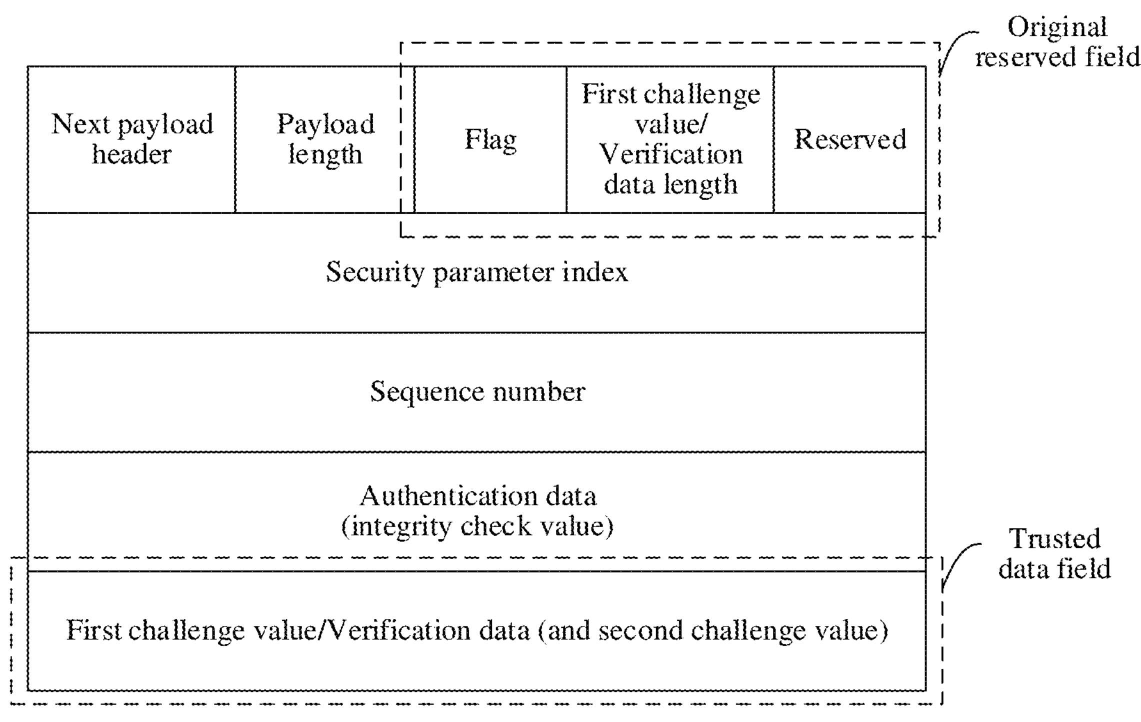
FIG. 9 is a diagram of a structure of still another packet header of an AH protocol data packet according to an embodiment.
FIG. 10 is an interaction diagram of an AH protocol communication method according to an embodiment.

FIG. 9 is a diagram of a structure of still another packet header of an AH data packet according to an embodiment. As shown in FIG. 9, the packet header of the AH data packet may include a flag, trusted data, and a first challenge value length field.

Parts of a reserved field are split in the AH data packet to serve as the flag and the challenge value length field respectively, where the flag is used to identify that the AH data packet includes a first challenge value. In addition, a trusted data field is newly added following an authentication data field, and is used to store the first challenge value, so that an attester generates trusted response information.

If the attester sends the AH data packet to a verifier, and includes, in the AH data packet, response information made for a verification request of the verifier, the AH data packet may also be sent by using the structures of the packet header of the AH data packet described in FIG. 5 to FIG. 9.

As shown in FIG. 5, in a possible implementation, the packet header of the AH data packet includes only the flag, where the flag is used to identify that the AH data packet includes the trusted response information made by the attester. The trusted response information includes attestation information or an attestation result, such as verification data, the verification data may be stored in the trusted data field, and the trusted data field may be located at any position in the packet body of the AH data packet.

Optionally, one bit is selected from the reserved field as the flag field, and if the bit is 1, it indicates that the AH data packet includes the attestation information or the attestation result.

Optionally, two bits are selected from the reserved field as the flag field. For example, if the bits are 10, it indicates that the AH data packet includes the verification data. If the bits are 11, it indicates that the AH data packet includes the verification data and includes a second challenge value, where the second challenge value is used by the verifier to generate the trusted response information, and the attester verifies whether the attester is trusted. Therefore, bidirectional verification is performed.

In a possible implementation, the verification data includes the attestation information. The attester performs trustworthiness measurement and generates the attestation information, and the attester sends the attestation information to the verifier, in other words, sends the AH data packet including the attestation information. The attestation information includes a quote and a measurement log, the quote includes a digest of the measurement log, and the measurement log includes process information for performing trustworthiness measurement by the attester.

Optionally, the attestation information may include a measurement value.

Optionally, the attestation information may further include a trusted signature.

Optionally, the attestation information may further include a running status, a health degree, security-related configuration or construction information, hardware, firmware, software, a file system, an attestation environment identity, a trusted execution environment, and data integrity of the attester.

In another possible implementation, the verification data includes the attestation result. Before the verifier requests to verify whether the attester is trusted, another verifier has performed trustworthiness verification on the attester, and sends an attestation result to the attester. Therefore, the attester may directly send the attestation result to the verifier, where the attestation result includes one or more of identity information, trusted content, and freshness.

Optionally, the attestation result may further include one or more of the following information:

- configuration: the verifier verifies a configuration of the attester;
- executable file (executables): the verifier verifies a real-time file, a script, and/or another content loaded into a memory that are/is of the attester;
- file system (file-system): the verifier verifies a file system of the attester;
- hardware: the verifier verifies hardware and firmware that can sign and run a program of the attester;
- attestation environment identity (instance-identity): the verifier verifies an attestation environment identity of the attester, for example, an attestation identity key (attestation identity key, AIK) of a TPM;
- runtime-opaque: the verifier verifies opaqueness of the attester from the outside of the memory of the attester;
- source data (sourced-data): the verifier verifies integrity of data used by the attester; and storage-opaque: the verifier verifies that the attester can encrypt a persistent memory.

Optionally, the trusted data field may further include the second challenge value, so that the verifier generates the trusted response information based on the second challenge value, and the attester verifies whether the verifier is trusted. Therefore, bidirectional verification is performed, thereby improving security of a communication process.

The second challenge value may be any one of a trusted random number, a timestamp, a value of an agreed field, and a random number generated by the attester.

Optionally, the second challenge value may be further used for anti-replay of current verification request information.

Figure 6:
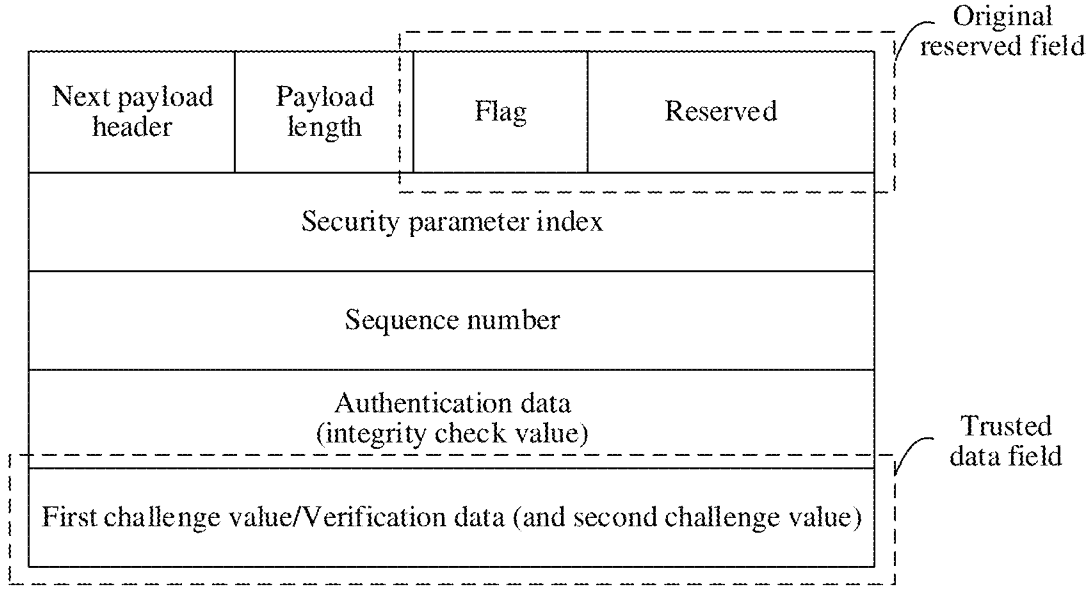
FIG. 6 is a diagram of a structure of another packet header of an AH protocol data packet according to an embodiment.

In a possible implementation, the verification data may alternatively be located in the packet header of the AH data packet, in other words, the packet header of the AH data packet includes the flag and the verification data. The structure of the AH packet header is shown in FIG. 6. Apart of the reserved field is split as the flag, and the trusted data field is newly added following the authentication data field to store the verification data. The trusted data field may further include the second challenge value, and the attester converts into the verifier when making the trusted response, to perform bidirectional verification.

In a possible implementation, the packet header of the AH data packet may include the flag field and a verification data length field, such as a length of the attestation information or the attestation result. The structure of the AH packet header is shown in FIG. 7, and the verification data length field indicates the length of the attestation information or the attestation result.

In a possible implementation, the packet header of the AH data packet may include only the trusted data field. The structure of the AH packet header is shown in FIG. 8. The trusted data field includes the verification data of the attester, such as the attestation information or the attestation result. The trusted data field may further include the second challenge value. The attester converts into the verifier when making the trusted response, to implement bidirectional verification.

In a possible implementation, the packet header of the AH data packet may include the flag field, the verification data length field, and the trusted data field. The structure of the AH packet header is shown in FIG. 9, where the trusted data field includes the verification data of the attester, such as the attestation information or the attestation result.

FIG. 10 is a diagram of an AH communication procedure according to an embodiment. In information exchanged in the AH communication procedure, any one of the AH data packets that include trusted extension information and that are described in FIG. 5 to FIG. 9 is used.

S1010: A first network element integrates trusted request information.

The first network element searches a security policy database for the first matched security policy and determines whether to perform IPsec protection. An SA corresponding to the SP is searched for in a security association database, and a trusted extension field attribute in the security association database is checked. If there is no SA, IPsec invokes an IKE service to create the SA. If the SA has been created, the AH data packet is encrypted, and a message authentication code (MAC) may be selected and added, and the AH data packet integrated with the trusted request information is used, in other words, the AH data packet including the packet header structures described in FIG. 5 to FIG. 9 is used to request to verify whether a second network element is trusted.

S1020: The first network element sends the trusted request information, and correspondingly, the second network element receives the trusted request information.

The first network element sends the trusted request information to the second network element, where the trusted request information is included in the AH data packet, and the trusted request information is used to request to verify whether the second network element is trusted.

S1030: The second network element integrates attestation information.

After receiving the request information of the first network element, the second network element searches a local security association database for a corresponding SA based on a received SPI value, processes the data packet by using a behavior defined in the SA, including verifying the MAC and decrypting the data packet, and adds verification information requested by the first network element to the AH data packet header.

In a possible implementation, the second network element performs trustworthiness measurement, and adds the attestation information to the AH data packet, where the attestation information includes a quote and a measurement log, the quote includes a digest of the measurement log, and the measurement log includes process information for performing trustworthiness measurement by the second network element.

Optionally, the attestation information may further include a measurement value.

Optionally, the attestation information may further include a trusted signature.

In another possible implementation, before the second network element receives the trusted request information of the first network element, another verifier has verified the second network element, and sends an attestation result to the second network element. The second network element stores the attestation result, and when receiving the trusted request of the first network element, adds the attestation result to the AH data packet, so that the first network element checks whether the second network element is trusted.

Optionally, the attestation result includes one or more of identity information, trusted content, and freshness.

S1040: The second network element sends trusted response information, and correspondingly, the first network element receives the trusted response information.

The second network element sends the AH data packet having the trusted extension information to the first network element, where the AH data packet includes the response information.

In a possible implementation, the trusted response information includes the attestation information.

In another possible implementation, the trusted response information includes the attestation result.

S1050: The first network element verifies the trusted response information.

The first network element searches a local security association database for a corresponding SA based on a received SPI value and processes the data packet by using a behavior defined in the SA, including verifying the MAC and decrypting the data packet.

In a possible implementation, the trusted response information includes the attestation information. The first network element decrypts the trusted signature by using a public key and a challenge value sent by the first network element, compares a measurement value obtained through decryption with a standard value, to verify whether the second network element is trusted, and check validity of the measurement log.

In another possible implementation, the trusted response information includes the attestation result. The first network element directly checks the attestation result to determine whether the second network element is trusted.

In this implementation, the trustworthiness measurement is integrated into a communication process of an AH protocol. When the structure of the packet header of the AH data packet is not changed, an idle field is reused and the trusted extension information is added, and this is good for compatibility with an existing protocol and facilitates service deployment. An existing AH protocol authentication procedure is further improved, and a remote attestation request, response, and verification are added in the communication process, so that a node implements confidentiality, integrity, identity verification, and remote trustworthiness attestation in communication, and security is inherent in the communication process.

Before IPsec communication, a communication entity needs to first establish an SA to indicate a security policy, algorithm, and key to be used between communication entities.

Table 1 shows an SA data structure provided in this embodiment. As shown in Table 1, extension information such as trusted extension and a trigger mechanism is added to the existing SA data structure. When the SA is established, the trusted extension information is added, and is used by a node to determine whether to perform a trusted operation and an occasion for performing the trusted operation. The trusted operation may include any one of a trusted request, trustworthiness measurement, and a trusted response. The trusted request is to request to verify whether the attester is trusted. The trustworthiness measurement is integrity measurement. A hash value of code is calculated by using a hash function, and is compared with a stored hash value, to determine whether the code is changed, and determine, based on a comparison result, whether a platform is trusted. The trusted response means that the attester sends the response information to the verifier, so that the verifier verifies whether the attester is trusted. The response information may include the attestation information or the attestation result. As shown in Table 1, a security policy index (SPI) field is used to uniquely identify an SA. If a value of the SPI field is 0, it indicates that there is no SA, and a size of the SPI field may be 323 bits.

TABLE 1

| Security policy index (SPI) | Security policy database (SPD) selection value | Protocol | Algorithm and key | Trusted extension | Trigger mechanism |
|---|---|---|---|---|---|
| SPI 1 | TCP, 1.2.3.0/24, 5.6.7.0/24 | ESP tunnel from 4.5.6.7 | — | YES | Counting mechanism, timing mechanism, and time trigger mechanism |

TABLE 1-continued

| Security policy index (SPI) | Security policy database (SPD) selection value | Protocol | Algorithm and key | Trusted extension | Trigger mechanism |
|---|---|---|---|---|---|
| SPI 2 | — | ESP tunnel to 4.5.6.7 | — | No | — |

An SPD selection value field indicates an IP destination address. For example, TCP, 1.2.3.0/24, 5.6.7.0/24 indicates that the destination address is a transmission control protocol address.

A protocol field indicates which IPsec protocol is used. For example, ESP tunnel from 4.5.6.7 indicates that an ESP encryption protocol is used.

An algorithm and key field indicates an algorithm type and a key type that are used. For example, the algorithm type may include an information message digest 5 (MD5) algorithm, a secure hash algorithm (SHA) SHA-1, an SHA-2, and the like. The MD5 algorithm may generate a 128-bit message digest by inputting a message of any length, and the SHA-1 algorithm may generate a 160-bit message digest by inputting a message of a length less than $2^{64}$ bits. In comparison with the SHA-1, the SHA-2 algorithm has an increased quantity of bits of encrypted data, and security performance of the SHA-2 algorithm is much higher than that of the SHA-1. The key type may include a symmetric key, an asymmetric key, and the like. The symmetric key means that an encryption party and a decryption party use a same key. The asymmetric key is a pair of keys, including a public key and a private key. If the public key is used for encryption, the private key needs to be used for decryption. If the private key is used for encryption, the public key needs to be used for decryption.

A trusted extension field indicates whether a communication entity needs to perform a trusted operation, and the trusted operation includes one or more of a trusted request, trustworthiness measurement, a trusted response, and trustworthiness verification. If a value of the trusted extension field is YES, it indicates that the trusted operation needs to be performed. If a value of the trusted extension field is NO, it indicates that the trusted operation does not needs to be performed.

A trigger mechanism field indicates which trigger mechanism is used to trigger the trusted operation, and the trigger mechanism includes the counting mechanism, the timing mechanism, the event trigger mechanism, or the like.

Figures 11, 12:
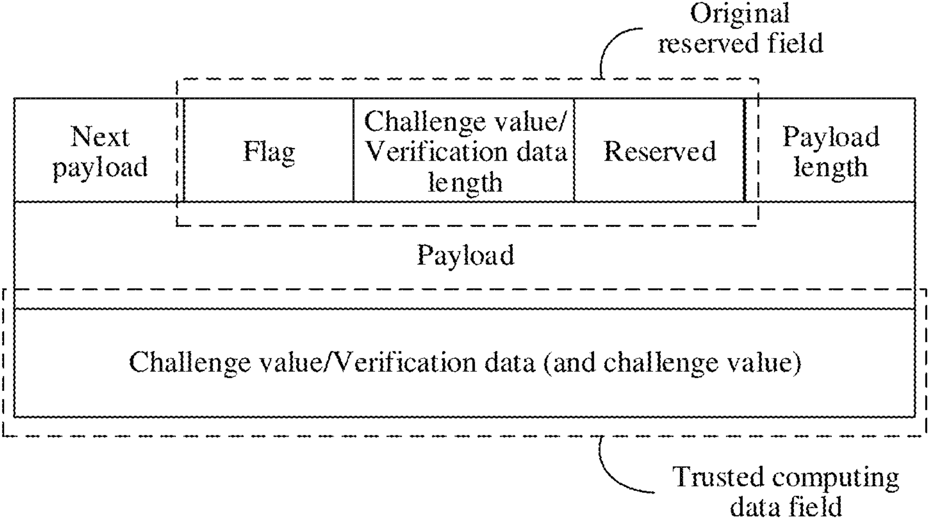
FIG. 11 is a diagram of a structure of a packet header of an IKE protocol data packet to which an embodiment is applicable.
FIG. 12 is a diagram of a structure of a packet header of an IKE protocol data packet according to an embodiment.

FIG. 11 shows a data structure of a packet header of an IKE protocol according to an embodiment. In a process of establishing an SA, trustworthiness measurement information is added to the packet header of the IKE protocol data packet. An original data structure of the IKE packet header is not changed, but trusted extension information is added to a data structure of a next payload header field of the IKE packet header.

As shown in FIG. 11, the structure of the IKE packet header includes the following fields:

An SPI of an IKE SA initiator (IKE SA Initiator's SPI) is an entity cookie used to initiate SA establishment, notification, or deletion.

An SPI of an IKE SA responder (IKE SA Responder's SPI) is an entity cookie used to respond to the SA establishment, notification, or deletion.

A next payload field is used to identify a type of a next payload. Currently, a range that is of the next payload field and that includes values from 33 to 55 has been occupied. For example, the value 33 indicates that the next payload is a security association, and the value 38 indicates that the next payload is a certificate request. A value greater than 55 is still reserved, and a range including values greater than 55 may be used as an identifier used to identify that the data packet includes the trusted extension information.

For example, if the value of the next payload header is 56, it indicates that the data packet includes a challenge value that is used by a verifier to initiate a verification request to an attester. If the value is 57, it indicates that the data packet includes verification data that is used by a verifier to verify whether an attester is trusted. If the value is 58, it indicates that the data packet includes verification data and a challenge value that are used by a verifier to verify whether an attester is trusted and initiate a verification request to the verifier for bidirectional verification.

In a development process of a future communication industry, a payload header whose value is greater than 55 may be occupied, but a solution in which an unoccupied value is used as an identifier to identify that a data packet includes trusted extension information needs.

A major version (MjVer) field indicates a major version of used ISAKMP.

A minor version (MnVer) field indicates a minor version of used ISAKMP.

An exchange type field indicates a key exchange mechanism and may include a mechanism such as public key encryption implementation or using a DH algorithm. The public key encryption implementation is that a sender uses a public key of a receiver to encrypt a key of the sender, and the receiver uses a private key of the receiver to decrypt the key to obtain the key of the sender, and vice versa. In this way, key exchange is implemented. The DH algorithm is Diffie-Hellman key exchange (DH) and may enable both parties to establish a key through an insecure channel without any pre-information of each other.

A flag field is used to set various options for ISAKMP exchange.

A message identifier (message ID) is a unique information identifier that is used to identify a protocol status.

A length field indicates a length of all information, including the packet header of the data packet and payload.

A data structure of the next payload is shown in FIG. 12. A reserved field in the next payload field may be reused, and trusted extension information such as a flag, trusted data, and a trusted data length may be added, to provide a manner of adding the trusted extension information for a packet header of a data packet that does not have a reserved field.

In a possible implementation, the reserved field includes a flag field.

If the verifier sends the IKE data packet to the attester:

Optionally, the flag field is used to trigger the attester to generate trusted response information, and the packet header of the IKE data packet may not include a challenge value field.

Optionally, the flag field is used to identify that the IKE data packet includes a challenge value, the challenge value may be stored in a trusted data field, and the trusted data field may be located following a payload field in the packet header of the data packet. This shows a diagram of a structure in which the trusted data field is located following the payload field in the packet header of the data packet. The trusted data field may alternatively be located at any position in a packet body of the data packet. This is not limited.

If the verifier sends the IKE data packet to the attester:

Optionally, the flag field is used to identify that the data packet includes verification data, such as attestation information or an attestation result.

Optionally, the flag field is used to identify that the data packet includes verification data and a challenge value, and the challenge value is used by the verifier to generate trusted response information and perform bidirectional verification.

Optionally, the flag field is used to identify that the data packet includes verification data and may trigger the verifier to generate trusted response information and perform bidirectional verification.

Optionally, one bit is selected from the reserved field as the flag field, and if the bit is 1, it indicates that the data packet includes trusted extension.

Optionally, two bits are selected from the reserved field as the flag field. For example, 01 indicates that the IKE data packet includes trusted request information; 10 indicates that the data packet includes trusted response information; and 11 indicates that the data packet includes the trusted response information and includes the trusted request information, and bidirectional verification is performed with the verifier.

FIG. 12 merely shows an example in which the packet header of the IKE data packet includes the flag, and the packet header of the IKE data packet may alternatively not include the flag. For example, the packet header of the IKE data packet includes only the trusted data field, and the verifier or the attester directly reads content such as the challenge value or the verification data or includes only a plurality of fields in which the trusted extension information is stored such as a verification data length field. This is not limited.

In a possible implementation, the trusted data field is newly added following the payload field, where the trusted data field includes the challenge value or the verification data, the verification data is used by the verifier to verify whether the attester is trusted, the verification data includes the attestation information or the attestation result, and the trusted data field may further include the challenge value that is used by the verifier to generate the verification data and perform bidirectional verification.

If the verifier sends the data packet to the attester, the trusted data field includes the challenge value, where the attester uses the challenge value to generate the attestation information.

Optionally, the challenge value may be any one of a trusted random number, a timestamp, and a value of an agreed field.

Optionally, the challenge value may be a random number generated by the verifier for performing trustworthiness measurement. For example, the random number generated by the verifier may be denoted as Ni.

If the attester sends the data packet to the verifier, the trusted data field includes the verification data.

Optionally, the verification data includes the attestation information, where the attestation information includes a quote and a measurement log. The measurement log is process information for performing trustworthiness measurement by the attester, and the quote may include a digest of the measurement log.

Optionally, the attestation information may further include a measurement value or a trusted signature.

Optionally, the trusted data field may further include a challenge value of the attester, so that the verifier generates the trusted response information and performs bidirectional verification, and a random number generated by the attester may be denoted as Nr.

Optionally, the verification data includes the attestation result, where the attestation result includes one or more of identity information, trusted content, and freshness.

FIG. 12 merely shows that the trusted data field is located in the packet header of the IKE data packet, and the trusted data field may alternatively be stored at any position in the packet body of the IKE data packet. This is not limited.

In a possible implementation, the reserved field may further include the challenge value or the verification data length field, to indicate a length value of the challenge value or the verification data. If the verifier sends the IKE data packet to the attester, the packet header of the data packet may include a challenge value length field. If the attester sends the IKE data packet to the verifier, the packet header of the data packet may include the verification data length field, where the verification data includes the attestation information or the attestation result.

FIG. 12 merely shows an example in which the challenge value or the verification data length field is located in the packet header of the IKE data packet, and the length field may alternatively be stored at any position in the packet body of the IKE data packet. This is not limited.

Figure 13:
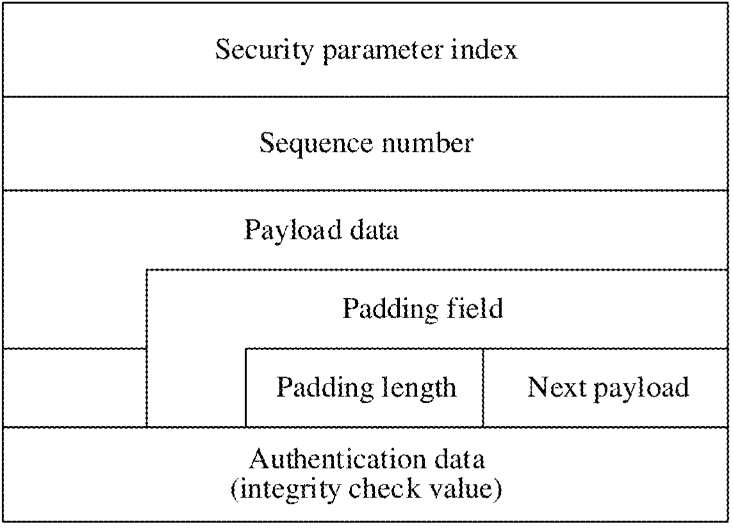
FIG. 13 is a diagram of a structure of a packet header of an ESP protocol data packet to which an embodiment is applicable.

FIG. 13 is a diagram of a structure of a packet header of an ESP data packet to which an embodiment is applicable. The packet header of the ESP data packet includes the following fields:

An SPI field is an IPsec security parameter index that is used to uniquely identify an IPsec security association, and a size of the SPI field may be 32 bits.

A sequence number field is used to uniquely identify each data packet, a value of the sequence number field increases from 1 to avoid a replay attack, and a size of the sequence number field may be 32 bits.

A payload data field includes variable-length data content in an original IP packet. A next header field identifies a type of content protected by ESP.

A padding field is used to increase a quantity of bits in the ESP packet header. A length of the padding field is related to a length and an algorithm of payload data. When a length of a packet to be encrypted is not a block length required by an encryption algorithm, padding and supplement are needed.

A padding length indicates the length of the padding field. When a value of the padding field is 0, it indicates that no padding is performed. A size of the padding field may be 8 bits.

A next payload field is used to identify a type of a next payload following the ESP packet header, and a size of the next payload field may be 8 bits.

An authentication data field includes a data integrity check value (ICV) that is used by a receiver for integrity check. An ESP verification function is optional. If data packet verification is enabled, an ICV value is added to a tail of encrypted data. A length of the authentication data field may be an integer multiple of 32 bits and may be 96 bits.

A next payload field in the packet header of the ESP data packet includes a reserved field, and a structure of the reserved field is the same as that of the reserved field in the packet header of the IKE data packet. Similarly, the reserved field is reused to store information such as a flag, trusted data, and a trusted data length. A structure and a function of the reserved field are similar to those in the solution described in FIG. 12. Details are not described herein again.

A next payload field of a protocol data packet such as an IPsec protocol may include a reserved field. The reserved field may be reused with added trusted extension information.

Figure 14:
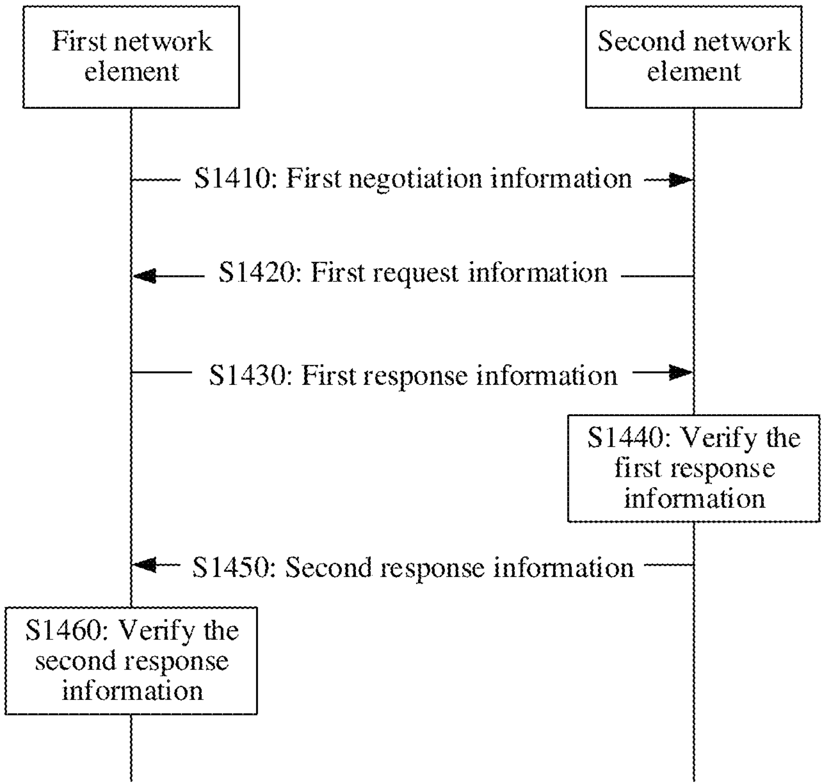
FIG. 14 is an interaction diagram of an IKE protocol communication method according to an embodiment.

FIG. 14 is an IKE communication procedure according to an embodiment. A data packet sent in the communication procedure includes the IKE packet header structure shown in FIG. 11 and FIG. 12. The IKE communication procedure may be used to negotiate and establish an SA.

S1410: A first network element sends first negotiation information to a second network element.

The first network element sends the first negotiation information to the second network element, where the first negotiation information includes a packet header of the first network element, an IKE SA suggestion, a DH algorithm public value, and a random number.

S1420: The second network element sends first request information to the first network element.

The second network element sends the first request information to the first network element, where the first request information includes the packet header of the first network element, the IKE SA suggestion, the DH algorithm public value, and the random number. The first request information further includes a request for a trusted certificate of the first network element.

S1430: The first network element sends first response information to the second network element.

The first network element sends the first response information to the second network element, where the first response information includes the packet header, the trusted certificate of the first network element, and attestation information of the first network element. In addition, the first response information may further include trusted certificate request information of the first network element for the second network element.

S1440: The second network element verifies the first response information.

The second network element verifies the trusted certificate and the attestation information that are included in the first response information and determines whether the first network element is trusted.

If the first network element is trusted, the second network element updates a local security association database, in other words, a security association from the first network element to the second network element is established.

S1450: The second network element sends second response information to the first network element.

The second network element sends the second response information to the first network element, where the second response information includes a trusted certificate of the second network element and attestation information of the second network element.

S1460: The first network element verifies the second response information.

The first network element verifies the trusted certificate and the attestation information that are included in the second response information and determines whether the second network element is trusted.

If the second network element is trusted, the first network element updates a local security association database, in other words, a security association from the second network element to the first network element is established. In this case, a bidirectional security association has been established between the first network element and the second network element, and communication may be performed by using a negotiated policy and key.

Figure 15:
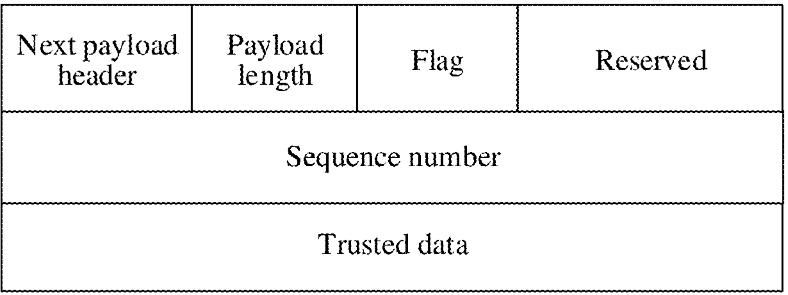
FIG. 15 is a diagram of a structure of a packet header of an IP data packet to which an embodiment is applicable.

FIG. 15 shows a structure of a packet header of an IP data packet according to an embodiment. Remote attestation can be performed without using a packet header of an AH protocol data packet, an IKE protocol data packet, or an ESP protocol data packet in an IPsec protocol system and without reusing a reserved field in a packet header of an IPsec data packet.

As shown in FIG. 15, the packet header of the data packet includes the following fields:

Next payload header (next header) field: A length of the next payload header field may be 8 bits and indicates a protocol of a next packet header. For example, when a value of the next payload header field is 51, it indicates that a packet header of a next sent data packet is the packet header of the AH protocol data packet; or when a value of the next payload header field is 50, it indicates that a packet header of a next sent data packet is the packet header of the ESP protocol data packet. Currently, all values that are of a next payload header and that range from 0 to 140 are occupied, 141 to 254 are still reserved, and a value in a reserved range may be used as an identifier used to identify that the data packet includes trusted extension information.

For example, if the value of the next payload header is 142, it indicates that the data packet includes a challenge value that is used by a verifier to initiate a verification request to an attester. If the value is 143, it indicates that the data packet includes verification data that is used by a verifier to verify whether an attester is trusted. If the value is 144, it indicates that the data packet includes verification data and a challenge value that are used by a verifier to verify whether an attester is trusted and initiate a verification request to the verifier for bidirectional verification.

In a development process of a future communication industry, a payload header whose values ranging from 141 to 254 may be occupied, but an unoccupied value may be used as an identifier to identify that a data packet includes trusted extension information.

Flag bit field: A flag may be used to identify that the data packet includes the trusted extension information.

Optionally, if the value of the next payload header field is within the value range from 0 to 140, the flag field may trigger the attester to generate the verification data.

Optionally, the flag field occupies one bit, and if the bit is 1, it indicates that the packet header or a packet body of the data packet includes the challenge value.

Optionally, the flag field occupies two bits. For example, if the bits are 01, it indicates that the data packet includes the challenge value, or the packet header of the data packet may trigger the attester to generate the verification data. If the bits are 10, it indicates that the data packet includes the verification data. If the bits are 11, it indicates that the data packet includes the verification data and the challenge value, where the verification data is used by the verifier to verify whether the attester is trusted, the challenge value is used by the verifier to generate the verification data, and the attester verifies whether the verifier is trusted. Alternatively, if the bits are 11, it indicates that the data packet includes the verification data, and the packet header of the data packet may trigger the verifier to generate the verification data.

Optionally, the packet header of the data packet may alternatively not include the flag field, and only the next payload field identifies that the data packet includes the trusted extension information or triggers the verifier to generate the verification data.

A payload length field indicates a length of the packet header.

A reserved field is a preset reserved bit. A value of the reserved field is 0 in an initial state and is reserved for future use.

A sequence number field is a value that increases from 1 and is used to avoid a replay attack of the data packet.

A trusted data field includes the challenge value, the verification data, or the like.

If the verifier sends the data packet to the attester, the trusted data field includes the challenge value.

The challenge value may be any one of a trusted random number, a timestamp, and a value of an agreed field.

The trusted random number is a random number provided by a trusted third party trusted by both the verifier and the attester, and when being used as the challenge value, the trusted random number may be stored in the trusted data field.

The timestamp is a trusted clock trusted by both the verifier and the attester, for example, clock information generated by a clock endorsed by an endorser, and when being used as the challenge value, the timestamp may be stored in the trusted data field.

The value of the agreed field may be a value of any field that is in a communication protocol and that is pre-agreed on by the verifier and the attester. For example, a sequence number of the data packet is a sequence number of a data packet sent in real time when the verifier initiates trustworthiness verification to the attester, and the verifier reuses the sequence number of the data packet sent this time as the challenge value. The challenge value may be directly stored in the sequence number field, and the flag is used to identify that the data packet includes the challenge value. When reading the sequence number field, the attester may know that a trusted response needs to be made.

The challenge value may alternatively be a random number generated by the verifier to perform trustworthiness verification, and the random number may be stored in the trusted data field.

Optionally, the challenge value may be further used to avoid a replay attack of a current verification request.

If the attester sends the data packet to the verifier, the trusted data field includes the verification data.

In a possible implementation, the verification data is the attestation information. The attester performs trustworthiness measurement and generates the attestation information, and the attester sends the attestation information to the verifier, in other words, sends the data packet including the attestation information. The attestation information includes a quote and a measurement log, the quote includes a digest of the measurement log, and the measurement log includes process information for performing trustworthiness measurement by the attester.

Optionally, the attestation information may include a measurement value.

Optionally, the attestation information may further include a trusted signature.

Optionally, the attestation information may further include a running status, a health degree, security-related configuration or construction information, hardware, firmware, software, a file system, an attestation environment identity, a trusted execution environment, and data integrity of the attester.

In another possible implementation, the verification data is the attestation result. Before the verifier requests to verify whether the attester is trusted, another verifier has performed trustworthiness verification on the attester, and sends an attestation result to the attester. Therefore, the attester may directly send the attestation result to the verifier, where the attestation result includes one or more of identity information, trusted content, and freshness.

In another possible implementation, the verification data further includes the challenge value that is used by the attester to initiate a verification request to the verifier to perform bidirectional verification.

Optionally, the packet header of the data packet may alternatively not include the trusted data field, and the trusted data field may be stored at any position in the packet body of the data packet.

In this embodiment, using the packet header of the data packet can reduce dependency on an existing protocol, and is not limited by whether there is a reserved field in the existing protocol, so that a more professional and flexible remote attestation method can be provided.

Figure 16:
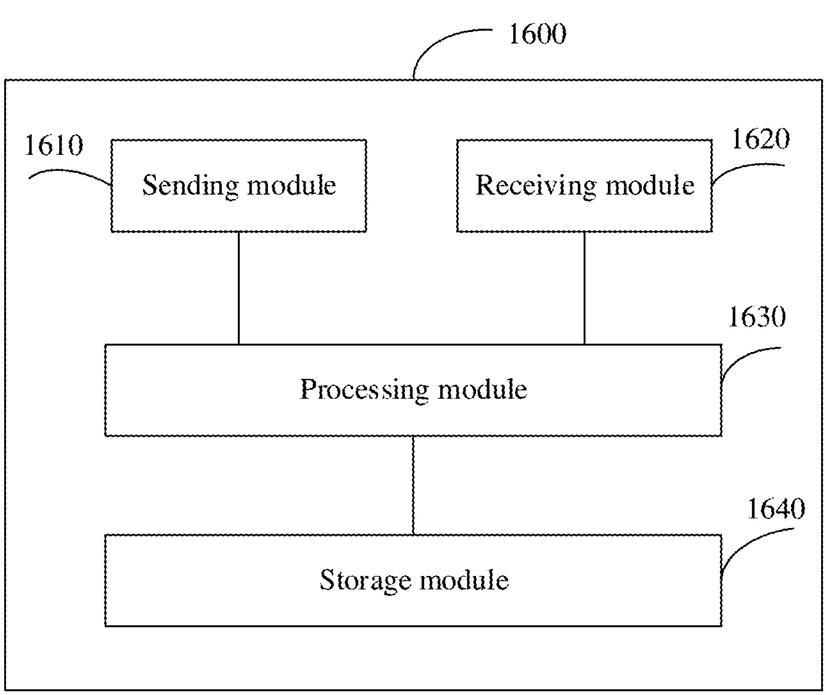
FIG. 16 is a block diagram of an apparatus according to an embodiment.

FIG. 16 is a block diagram of a structure of a communication apparatus according to an embodiment. The communication apparatus may have a function of the first network element or the second network element in the foregoing method embodiments and may be configured to perform the steps performed by the first network element or the second network element in the foregoing method embodiments.

In a possible implementation, a communication apparatus 1600 shown in FIG. 16 may be used as the first network element in the foregoing method embodiments, and performs the steps performed by the first network element in the foregoing method embodiments.

As shown in FIG. 16, the communication apparatus 1600 may include a sending module 1610 and a receiving module 1620.

The sending module 1610 may be configured to support the communication apparatus 1600 in sending information, for example, performing sending actions performed by the first network element in S210, S1020, S1410, and S1430 in FIG. 2, FIG. 3, FIG. 10, and FIG. 14.

The receiving module 1620 may be configured to support the communication apparatus 1600 in receiving information, for example, performing receiving actions performed by the first network element in S220, S320, S1040, S1420, and S1450 in FIG. 2, FIG. 3, FIG. 10, and FIG. 14.

Optionally, the communication apparatus 1600 may further include a processing module 1630. The processing module 1630 is coupled to the sending module 1610 and the receiving module 1620 and may be configured to support the communication apparatus 1600 in performing the processing actions in the foregoing method embodiments, for example, performing the processing actions performed by the first network element in S330, S1010, S1050, S1460, and the like in FIG. 2, FIG. 3, FIG. 10, and FIG. 14.

In another possible implementation, a communication apparatus 1600 shown in FIG. 16 may be used as the second network element in the foregoing method embodiments, and performs the steps performed by the second network element in the foregoing method embodiments.

As shown in FIG. 16, the communication apparatus 1600 may include a sending module 1610 and a receiving module 1620.

The sending module 1610 may be configured to support the communication apparatus 1600 in sending information, for example, performing sending actions performed by the second network element in S220, S320, S1040, S1420 and S1450 in FIG. 2, FIG. 3, FIG. 10, and FIG. 14.

The receiving module 1620 may be configured to support the communication apparatus 1600 in receiving information, for example, performing receiving actions performed by the second network element in S210, S1020, S1410, and S1430 in FIG. 2, FIG. 3, FIG. 10, and FIG. 14.

Optionally, the communication apparatus 1600 may further include a processing module 1630. The processing module 1630 is coupled to the sending module 1610 and the receiving module 1620 and may be configured to support the communication apparatus 1600 in performing the processing actions in the foregoing method embodiments, for example, performing the processing actions performed by the second network element in S310, S1030, S1440, and the like in FIG. 2, FIG. 3, FIG. 10, and FIG. 14.

Optionally, the communication apparatus 1600 may further include a storage module 1640, configured to store program code and data of the communication apparatus 1600.

Figure 17:
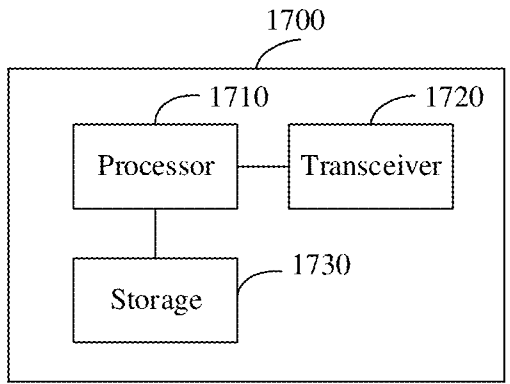
FIG. 17 is a block diagram of another apparatus according to an embodiment.

FIG. 17 is a block diagram of a communication device 1700 according to an embodiment. As shown in the figure, the communication device 1700 includes at least one processor 1710 and a transceiver 1720. The processor 1710 is coupled to a memory and is configured to execute instructions stored in the memory, to control the transceiver 1720 to send a signal and/or receive a signal.

Optionally, the communication device 1700 further includes a memory 1730, configured to store instructions.

In some embodiments, the processor 1710 and the memory 1730 may be combined into one processing apparatus, and the processor 1710 is configured to execute program code stored in the memory 1730 to implement the foregoing functions. During implementation, the memory 1730 may alternatively be integrated into the processor 1710 or may be independent of the processor 1710.

In some embodiments, the transceiver 1720 may include a receiver (or referred to as a receive machine) and a transmitter (or referred to as a transmit machine).

The transceiver 1720 may further include an antenna. There may be one or more antennas. The transceiver 1720 may alternatively be a communication interface or an interface circuit.

When the communication device 1700 is a chip, the chip includes a transceiver unit and a processing unit. The transceiver unit may be an input/output circuit or a communication interface. The processing unit may be a processor, a microprocessor, or an integrated circuit integrated on the chip.

When the communication apparatus is a chip used in a network device, the network device chip implements a function of the network device in the foregoing method embodiments. The network device chip receives information from another module (for example, a radio frequency module or an antenna) in the network device, where the information is sent by a terminal or another network device to the network device. Alternatively, the network device chip outputs information to another module (for example, a radio frequency module or an antenna) in the network device, where the information is sent by the network device to a terminal or another network device.

An embodiment further provides a non-transitory computer-readable storage medium. The non-transitory computer-readable storage medium stores a computer program or instructions, and the computer program or the instructions are executed by a computer (for example, a processor), to implement a part or all of steps of any method performed by any apparatus in the embodiments.

An embodiment further provides a computer program product including instructions. When the computer program product runs on a computer, a part or all of steps of any method performed by any apparatus in the embodiments are performed.

A person of ordinary skill in the art may be aware that, in combination with the examples described in the embodiments, units and algorithm steps can be implemented by electronic hardware or a combination of computer software and electronic hardware. Whether the functions are performed by hardware or software depends on particular applications. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position or may be distributed on a plurality of network units. Some or all of the units may be selected based on actual requirements to achieve the objectives of the embodiments.

In addition, functional units in the embodiments may be integrated into one processing unit, each of the units may exist alone physically, or two or more units may be integrated into one unit.

When the functions are implemented in a form of a software functional unit and sold or used as an independent product, the functions may be stored in a non-transitory computer-readable storage medium. Based on such an understanding, the embodiments may be implemented in a form of a software product. The computer software product is stored in a storage medium and includes several instructions for instructing a computer device (which may be a personal computer, a server, a network device, or the like) to perform all or a part of the steps of the methods described in the embodiments. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely implementations of embodiments, but are not intended as limiting. Any variation or replacement readily figured out by a person skilled in the art shall fall within the scope of the embodiments.

What is claimed is:

1. A method comprising:

sending a first data packet, wherein the first data packet comprises first request information used to request to verify whether a second network element is trusted; and receiving a second data packet, wherein the second data packet comprises first response information used for verifying whether the second network element is trusted, the first response information comprises attestation information including both a quote and a measurement log related to trustworthiness measurement of the second network element, and the quote includes a digest of the measurement log.

2. The method according to claim 1, wherein the first request information comprises a first field, the first field is a first flag used to trigger generation of the first response information.

3. The method according to claim 2, wherein the first flag is used to identify that the first request information comprises a first challenge value used to generate the first response information.

4. The method according to claim 3, wherein the first request information comprises a second field and the second field comprises the first challenge value.

5. The method according to claim 4, wherein the first challenge value a timestamp comprising clock information generated by a clock endorsed by an endorser, wherein the clock is trusted by both a first network element and the second network element.

6. A method comprising:

receiving a first data packet, wherein the first data packet comprises first request information used to request to verify whether a second network element is trusted; and sending second data packet, wherein the second data packet comprises first response information used for verifying whether the second network element is trusted, the first response information comprises attestation information including both a quote and a measurement log related to trustworthiness measurement of the second network element, and the quote includes a digest of the measurement log.

7. The method according to claim 6, wherein the first request information comprises a first field, the first field is a first flag used to trigger generation of the first response information.

8. The method according to claim 7, wherein the first flag is used to identify that the first request information comprises a first challenge value used to generate the first response information.

9. The method according to claim 8, wherein the first request information comprises a second field and the second field comprises the first challenge value.

10. The method according to claim 8, wherein the first challenge value is a timestamp comprising clock information generated by a clock endorsed by an endorser, wherein the clock is trusted by both a first network element and the second network element.

11. A communication apparatus, comprising:

a processor, coupling to a memory storing computer instructions, which when executed by the processor, cause the communication apparatus to:

send a first data packet, wherein the first data packet comprises first request information used to request to verify whether a second network element is trusted; and receive a second data packet, wherein the second data packet comprises first response information used for verifying whether the second network element is trusted, the first response information comprises attestation information including both a quote and a measurement log related to trustworthiness measurement of the second network element, and the quote includes a digest of the measurement log.

12. The communication apparatus according to claim 11, wherein the first request information comprises a first field, the first field is a first flag used to trigger generation of the first response information.

13. The communication apparatus according to claim 12, wherein the first flag is used to identify that the first request information comprises a first challenge value used to generate the first response information.

14. The communication apparatus according to claim 13, wherein the first request information comprises a second field and the second field comprises the first challenge value.

15. The communication apparatus according to claim 14, wherein the first challenge value is a timestamp comprising clock information generated by a clock endorsed by an endorser, wherein the clock is trusted by both a first network element and the second network element.

16. A communication apparatus, comprising:

a processor coupled to a memory storing computer instructions, which when executed by the processor, cause the communication apparatus to:

receive a first data packet, wherein the first data packet comprises first request information used to request to verify whether the communication apparatus is trusted; and send second data packet, wherein the second data packet comprises first response information used for verifying whether the second network element is trusted, the first response information comprises attestation information including both a quote and a measurement log related to trustworthiness measurement of the second network element, and the quote includes a digest of the measurement log.

17. The communication apparatus according to claim 16, wherein the first request information comprises a first field, the first field is a first flag used to trigger generation of the first response information.

18. The communication apparatus according to claim 17, wherein the first flag is used to identify that the first request information comprises a first challenge value used to generate the first response information.

19. The communication apparatus according to claim 18, wherein the first request information comprises a second field and the second field comprises the first challenge value.

20. The communication apparatus according to claim 18, wherein the first challenge value is a timestamp comprising clock information generated by a clock endorsed by an endorser, wherein the clock is trusted by both a first network element and the second network element.

* * * * *